US007225251B2

United States Patent
Suzuki

(10) Patent No.: US 7,225,251 B2
(45) Date of Patent: May 29, 2007

(54) SYSTEM AND METHOD FOR SUPERVISING IMAGE FORMING APPARATUSES BY REMOTELY DOWNLOADING FIRMWARE BASED ON UPDATED HARDWARE

(75) Inventor: Kobun Suzuki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 860 days.

(21) Appl. No.: 09/900,919

(22) Filed: Jul. 10, 2001

(65) Prior Publication Data

US 2002/0046265 A1    Apr. 18, 2002

(30) Foreign Application Priority Data

Jul. 11, 2000 (JP) ............................. 2000-210353
Jan. 31, 2001 (JP) ............................. 2001-023910

(51) Int. Cl.
*G06F 15/173* (2006.01)
*G06F 15/16* (2006.01)

(52) U.S. Cl. ................... 709/224; 709/203; 709/208; 709/223

(58) Field of Classification Search ............... 709/208, 709/218, 220, 221, 223, 244
See application file for complete search history.

(56) References Cited

U.S. PATENT DOCUMENTS

| | | | | |
|---|---|---|---|---|
| 5,552,901 A | * | 9/1996 | Kikuchi et al. | 358/468 |
| 5,684,607 A | * | 11/1997 | Matsumoto | 358/442 |
| 5,768,516 A | * | 6/1998 | Sugishima | 709/217 |
| 5,768,583 A | * | 6/1998 | Orzol et al. | 713/1 |
| 5,819,015 A | * | 10/1998 | Martin et al. | 358/1.15 |
| 5,928,335 A | * | 7/1999 | Morita | 709/203 |
| 5,996,029 A | * | 11/1999 | Sugiyama et al. | 710/15 |
| 6,009,284 A | * | 12/1999 | Weinberger et al. | 399/8 |
| 6,209,089 B1 | * | 3/2001 | Selitrennikoff et al. | 713/2 |
| 6,308,205 B1 | * | 10/2001 | Carcerano et al. | 709/221 |
| 6,930,785 B1 | * | 8/2005 | Weyand et al. | 358/1.1 |

* cited by examiner

*Primary Examiner*—Ario Etienne
*Assistant Examiner*—Hussein El-chanti
(74) *Attorney, Agent, or Firm*—Oblon, Spivak, McClelland, Maier & Neustadt, P.C.

(57) ABSTRACT

An image forming apparatus supervisory system includes a central supervisory apparatus that remotely supervises a plurality of image forming apparatuses installed in a plurality of user sides. A plurality of communications adapters are provided to connect to the central supervisory apparatus by a communication line. A plurality of interfaces are provided to connect each of the plurality of image forming apparatuses with each of the plurality of communications adapters. A firmware download device is provided in the central supervisory apparatus to remotely download prescribed updated firmware to an applicable one or more image forming apparatuses in accordance with updated hardware thereof. A hardware update device is provided to update the hardware.

18 Claims, 21 Drawing Sheets

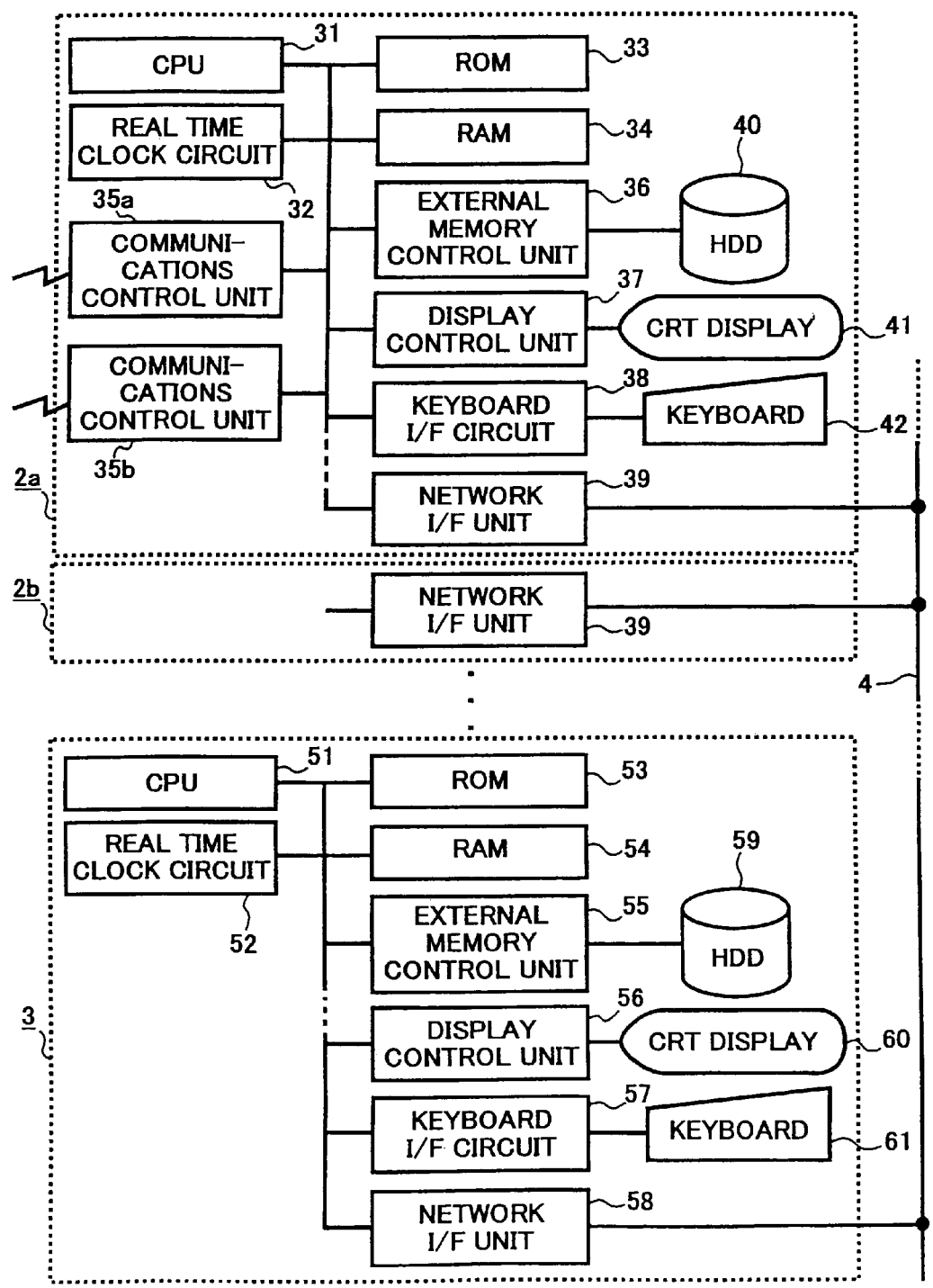

FIG. 4

| MODEL/ MACHINE No. | USER ID | USER NAME | ADDRESS | BUILDING NAME | NAME OF PERSON IN CHARGE OF USER | TEL.No. OF PERSON IN CHARGE OF USER |
|---|---|---|---|---|---|---|
| XX···1 | XXX5600 | XXX | ABC | BUILDING A | Mr. A | 12-3456-7890 |
| XX···2 | XXX1000 | XX | DEF | BUILDING B | Mr. B | 23-4567-8901 |

| COMMUNI- CATIONS ADAPTER MODEL/ MACHINE No. | COMMUNI- CATIONS ADAPTER CONNECTION No. | SERVICE SECTION | | | |
|---|---|---|---|---|---|
| | | SERVICE STATION NAME | CONTACT DISTINATION | CE IN CHARGE OF SERVICE | ... |
| XXX-1234 | 12-6543-9876 | YOKO- HAMA SS | XX-XXXX | Mr. C | |
| XXX-5678 | 98-7654-3210 | YOKO- HAMA SS | XX-XXXX | Mr. D | |

FIG. 5

| MODEL/ MACHINE No. | HARDWARE CONSTRUCTION | | | | | | |
|---|---|---|---|---|---|---|---|
| | CONTROL BASEBOARD/ROM | | | | | | |
| | CONTROL BASEBOARD C1 Ver. | ROM C11 Ver. | ROM C12 Ver. | ... | CONTROL BASEBOARD C2 Ver. | CONTROL BASEBOARD C21 Ver. | CONTROL BASEBOARD C22 Ver. |
| XX···1 | 1.00 | 1.22 | 1.00 | | 1.01 | 0.00 | 0.00 |
| XX···2 | 1.02 | 1.00 | 0.00 | | 1.13 | 1.00 | 0.00 |
| ... | | | | | | | |

| UNIT | | | | |
|---|---|---|---|---|
| OPTICAL UNIT CONTROL UNIT D1 Ver. | HIGH VOLTAGE POWER SOURCE UNIT D2 Ver. | MOTOR CONTROL UNIT D3 Ver. | SORTER CONTROL UNIT D4 Ver. | ... |
| 1.00 | 1.22 | 1.22 | 1.00 | |
| 1.02 | 1.00 | 1.00 | 0.00 | |

(1) HARDWARE CONSTRUCTION READ INSTRUCTION FORMAT
CENTRAL SYSTEM → IMAGE FORMING APPARATUS

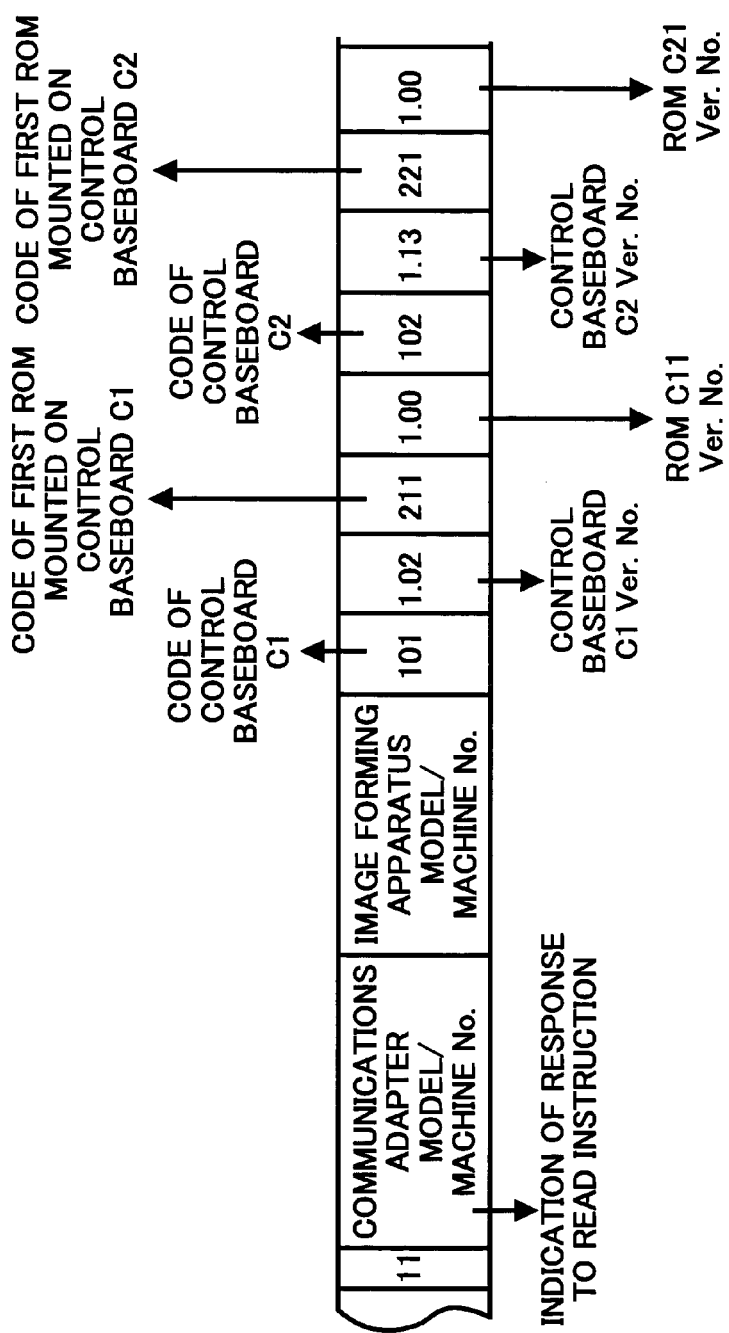

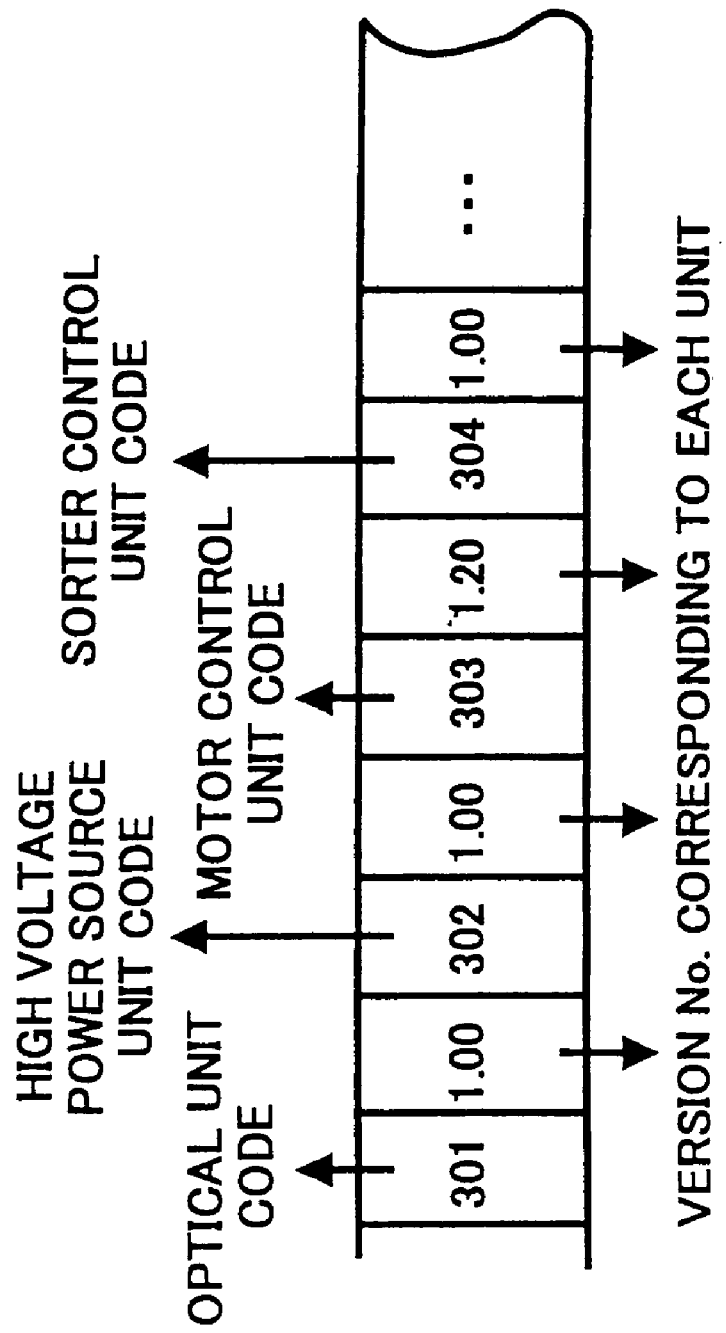

FIG. 18

| HARDWARE CONSTRUCTION | | | | | |
|---|---|---|---|---|---|
| CONTROL BASEBOARD / ROM | | | | | |
| CONTROL BASEBOARD C1 Ver. | ROM C11 Ver. | ROM C12 Ver. | ... | CONTROL BASEBOARD C2 Ver. | ROM C21 Ver. | ROM C22 Ver. | ... |
| 1.00 | 1.22 | 1.00 | | X.XX | X.XX | X.XX | |

| UNIT | | | | |
|---|---|---|---|---|
| OPTICAL UNIT CONTROL UNIT D1 | HIGH VOLTAGE POWER SOURCE UNIT D2 | MOTOR CONTROL UNIT D3 | SORTER CONTROL UNIT D4 | ... |
| 1.20 | 1.00 | 1.10 | 0.00 | |

SYSTEM AND METHOD FOR SUPERVISING IMAGE FORMING APPARATUSES BY REMOTELY DOWNLOADING FIRMWARE BASED ON UPDATED HARDWARE

CROSS REFERENCE TO A RELATED APPLICATION

This document claims priority under 35 U.S.C. § 119 to Japanese Patent Application Nos. 2000-210353 and 2001-023910 filed on Jul. 11, 2000 and Jan. 31, 2001, respectively, the entire contents of which are hereby incorporated herein by reference.

BACKGROUND OF THE INVENTION

1. Field of the Invention

The present invention generally relates to a system and method for supervising a plurality of image forming apparatuses such as copiers, printers, duplicators, facsimile apparatuses, etc., by using a central supervisory apparatus having a computer connected to image forming apparatuses via a communications line, a plurality of communications adopters, and wireless or wired private use interfaces. In particular, the present invention relates to a central supervising apparatus capable of remotely downloading firmware to an applicable image forming apparatus based upon updated hardware.

2. Discussion of the Background

In a background image forming apparatus supervisory system, it is well known that a plurality of image forming apparatuses such as copiers, printers, duplicators, facsimile apparatuses, etc., installed in a plurality of user destinations are connected to a central supervisory apparatus (i.e., central system) disposed in a service center. In addition, it is also well known that the plurality of image forming apparatuses are connected to the central supervisory apparatus via a plurality of wireless or wired private use interfaces, a plurality of communications adopters remotely located at the user destinations, and a public communications line, or another line such as a dedicated communications line.

In another type of background image forming apparatus supervisory system, the central system monitors a firmware version of the image forming apparatus of the user destination so as to provide a user with suitable firmware when a prescribed specification is uniquely designed or designed around. In addition, the central system supervises an applicable image forming apparatus whose firmware is to be updated (i.e., version up) by downloading update firmware.

The above-described firmware may generally include a variety of image forming apparatus programs for controlling a variety of image forming apparatuses such as a standard construction image forming apparatus, and an optional construction image forming apparatus having an auto original document feeder, a sorter, a finisher, etc.

The central system generally stores, in its image forming apparatus supervisory database (DB), model/machine number information, firmware information such as a version of the firmware, optional construction data related to a plurality of remotely supervised image forming apparatuses, etc. However, the central system does not supervise information related to hardware such as a version of hardware (e.g. a control baseboard, a unit, a ROM, etc.). As a result, when a service person or service engineer (CE) exchanges prescribed hardware of an image forming apparatus and whose firmware is to be updated, but does not report the effect to an operator of the central system, supervisory information stored in the image forming apparatus supervisory DB does not conform to the information related to the prescribed hardware.

In addition, when updated firmware is later downloaded into the prescribed image forming apparatus for any reason (e.g. an application design is changed), the updated firmware will not conform to the currently mounted hardware, thereby causing a problem. To prevent such a problem, the CE generally calls on a user destination and researches a version of an applicable hardware before updating the firmware, thereby resulting in wasted time and labor. In addition, it is required for the center operator to perform remarkable labor, such as inputting of a search result by hand, when reporting to the central system. In addition, such an input could erroneously be performed.

SUMMARY OF THE INVENTION

Accordingly, an object of the present invention is to address the above and other problems and provide a novel information recordation system.

The above and other objects are achieved according to the present invention by providing a novel image forming apparatus supervisory system that supervises a plurality of image forming apparatuses disposed at a plurality of user sites. The image forming apparatus supervisory system includes a central supervisory apparatus that includes a computer, a plurality of communications adapters that connect to the central supervisory apparatus via a communication line, and a plurality of interfaces that connect each of the plurality of image forming apparatuses with each of the plurality of communications adapters. A firmware download device may be provided in the central supervisory apparatus so as to download prescribed updated firmware to an applicable one or more image forming apparatuses in accordance with updated hardware of the one or more image forming apparatuses. In addition, a firmware update device may be provided in each of the image forming apparatuses so as to update firmware for the one or more image forming apparatuses with the updated firmware when the updated firmware is downloaded.

In another embodiment, a control baseboard, a unit, and one or more non-volatile memories may be employed in the image forming apparatus as the hardware.

In yet another embodiment, a hardware read device may be provided so as to read hardware information of each of the plurality of image forming apparatuses. A hardware information transmission device may be provided so as to transmit the hardware information from each of the plurality of image forming apparatuses to the central system. A database may be provided in the central system so as to store hardware information of the plurality of image forming apparatuses. In addition, a database update device may be provided so as to update the database based upon the hardware information when receiving the hardware information from the one or more image forming apparatuses.

In yet another embodiment, the hardware information may be transmitted to the central supervisory apparatus when power is supplied to the image forming apparatus.

In yet another embodiment, the hardware information may be transmitted periodically, or when prescribed communications are performed between one or more applicable image forming apparatuses and the central system, or when the applicable one or more image forming apparatuses receives the hardware read instruction.

In yet another embodiment, the hardware information may be stored in a storage device provided in the each of the plurality of image forming apparatuses so as to store their own hardware information. In addition, a hardware information update device may be provided so as to update its own hardware information.

In yet another embodiment, a hardware read device may be provided in the hardware information update device so as to read at least a version number of the hardware. An information comparison device may be provided so as to compare the version number with the hardware information stored in the hardware information storage device. A determination device may be provided so as to determine if the version number conforms to the hardware information. In addition, the hardware information update device may update its own hardware information with the version number only when the version number conforms to the hardware information.

In yet another embodiment, a hardware read instruction transmission device may be provided in the central supervisory system so as to transmit a hardware read instruction to the applicable one or more image forming apparatuses. In addition, the hardware information may be read and transmitted to the central supervisory system either (1) when the hardware information transmission device of the applicable one or more image forming apparatuses receives the hardware read instruction, or (2) when the hardware information update device receives the hardware read instruction from the central supervisory apparatus.

In yet another embodiment, a conformity check device may be provided so as to check conformity of supervisory information including at least the hardware information with the updated firmware, and the updated firmware may be downloaded if the supervisory information conforms to the updated firmware.

In yet another embodiment, the updated firmware may be regenerated so as to conform to the supervisory information, if the supervisory information does not conform to the updated firmware.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a block chart for illustrating exemplary constructions of client computers 2a and 2b, a server 3, and so on, disposed in the central system illustrated in FIG. 1;

FIG. 4 is a chart for illustrating an exemplary construction of user information stored in a user DB 59a illustrated in FIG. 2;

FIG. 5 is a chart for illustrating an exemplary construction of image forming apparatus supervisory DB 59b illustrated in FIG. 2;

FIGS. 15A–15C are charts for illustrating a plurality of exemplary formats for a hardware read instruction and response information communicated between each of the image forming apparatuses, including the copier 13 or 23 and the central system 1 illustrated in FIG. 1;

FIG. 18 is a chart for illustrating a portion of supervisory information stored in the image forming apparatus supervisory DB 59b illustrated in FIG. 5.

DETAILED DESCRIPTION OF THE PREFERRED EMBODIMENT

Figure 1:
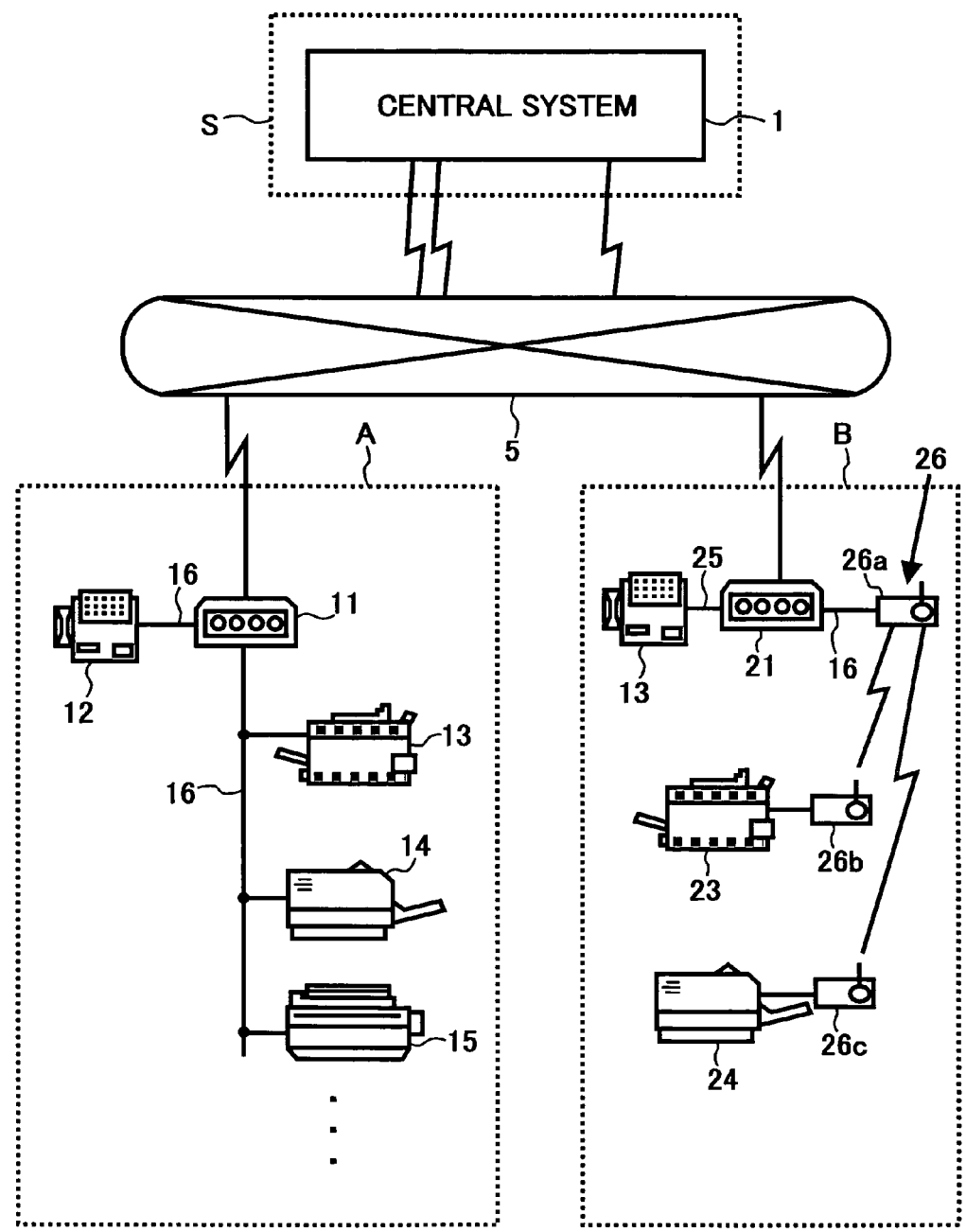
FIG. 1 is a schematic block diagram for illustrating an exemplary construction of an image forming apparatus supervisory system according to the present invention.

Referring now to the drawings, wherein like reference numerals designate identical or corresponding parts throughout several views, the present invention is now described in detail.

Figure 2:
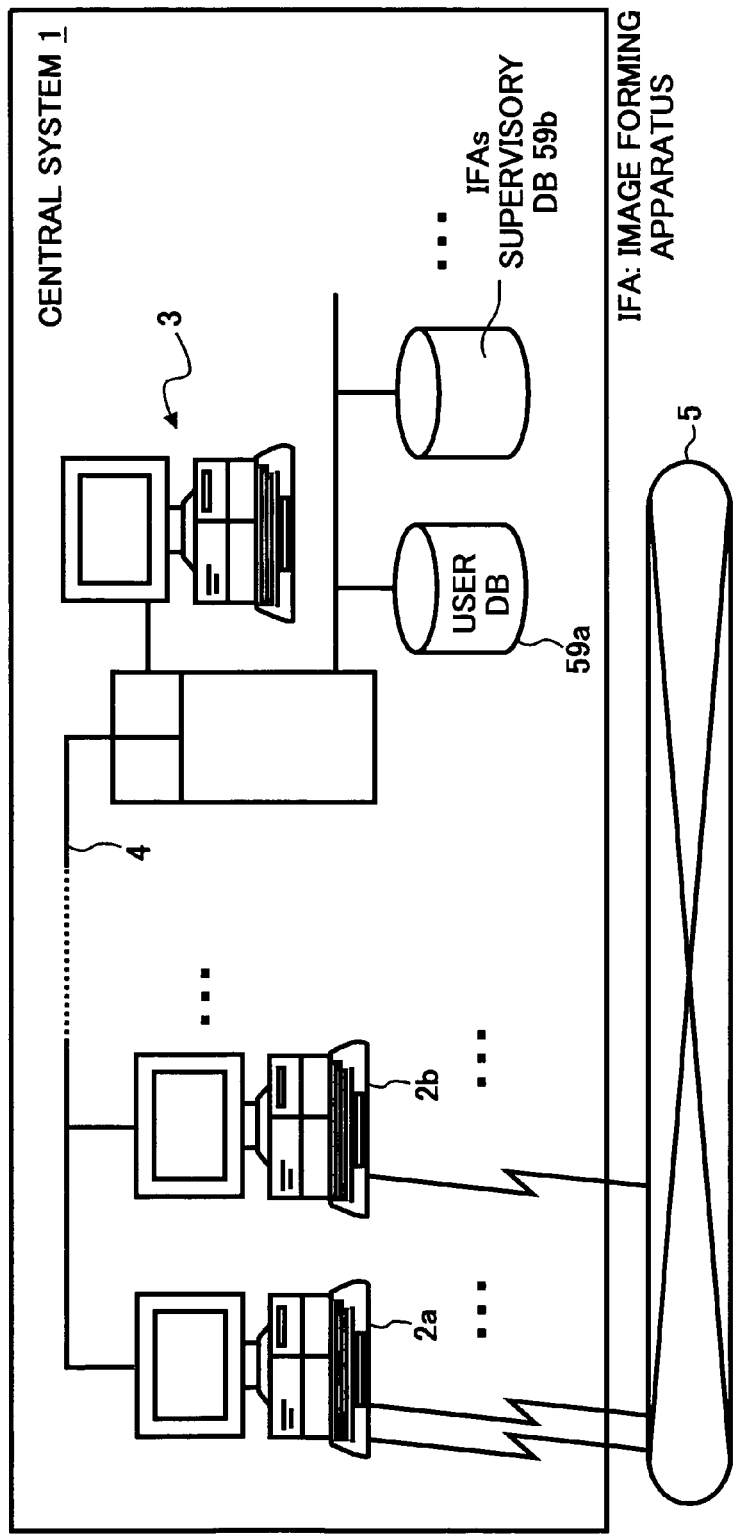
FIG. 2 is a block diagram for illustrating an exemplary construction of a central system illustrated in FIG. 1.

As illustrated in FIGS. 1 and 2, the image forming apparatus supervisory system may include a plurality of electronic image forming apparatuses installed in a plurality of user destinations (A), (B) and so on.

A plurality of exchangers (not shown) may also be installed in the user destinations. As shown in FIG. 2, the central system 1 may include a plurality of client computers (clients) 2a and 2b, a server 3, and a network 4 such as a LAN (local area network) and so on. The image forming apparatus or the like of the user destination (A), see FIG. 1, may include a communications adapter 11 connected to the center system (S) via a public communications line circuit 5 (or another communications line such as a private use communications line). Also included therein may be a plurality of image forming apparatuses such as a facsimile 12, a copier 13, a printer 14, a duplicator 15, and a wired or wireless interface (I/F) 16 that connects the communications adopter 11 with the respective of the image forming apparatuses.

The user (B) side image forming apparatus or the like may include a communications adapter 21, which connects to the central system 1 of the service center (S) via the public communications line network 5, and a plurality of image forming apparatuses such as a facsimile 22, a copier 23, a printer 24, etc. Also included therein may be a wired private use interface (I/F) 16 that connects to the facsimile apparatus 22 and a wireless private use I/F 26 that connects to the plurality of image forming apparatuses including the copier 23 and printer 24 to the communications adapter 21. The wireless private use I/F 26 may include a wireless equipment 26a, 26b, and/or 26c connected to the respective of the communications adapter 21, the copier 23, and the printer 24. Instead of employing both of the wired or wireless private use I/Fs 16 and 26, a prescribed network such as a LAN or the like is employable.

FIG. 3 illustrates a block chart for illustrating an exemplary construction of the clients 2a and 2b, and so on. The client 2a may include a CPU (central processing unit) 31, a real time clock circuit 32, and a ROM (read only memory) 33. Also included in the client 2a may be a RAM (random access memory) 34, a plurality of communications control units 35a, 35b and so on, and an external memory control unit 36. In addition, a display control unit 37 and a keyboard I/F circuit 38 may be included. Furthermore, a network I/F unit 39, a hard disc drive apparatus 40, a CRT (cathode ray tube) 41, and a keyboard 42 or similar devices may be included. Both of the illustration and description of the client 2b except for the network I/F unit 39 are omitted here because the construction of the client 2b may substantially be the same as that of the client 2a. Furthermore, a plurality of clients other than the client 2a employed within the central system 1 may have substantially the same construction, and thus both illustration and description thereof are also omitted.

The CPU 31 may function as a central processing apparatus that generally entirely controls the client 2a by using control programs stored in the ROM 33. The real time clock circuit 32 may generate time information with which the CPU 31 can determine a present time period when operating. The ROM 33 may be a read only memory that stores a variety of static data including control programs used by the CPU 31. The RAM 34 may be a readable and writable memory utilized as a work memory or the like when the CPU 31 performs data processing. The communications control units 35a and 35b may control communications with external instruments via the public communication line network 5.

The external memory control unit 36 may control interfacing with the hard disc apparatus (HDD) 40. The display control unit 37 may control interfacing with the CRT display 41 (or a LCD display and so on). The keyboard I/F circuit 38 may control interfacing with the keyboard 42. The network I/F unit 39 may control interfacing with another client such as the client 2b and the server 3 connected to the network 4.

The server 3 may include a CPU 51, a real time clock circuit 52, and ROM 53. Also included in the server 3 may be a RAM 54, an external memory control unit 55, and a display control unit 56. Furthermore, a keyboard I/F circuit 57, and a network I/F unit 58 may be included. In addition, an HDD 59, a CRT display 60, and a keyboard 61 or the like may also be included. The CPU 51 may be a central processing apparatus that generally entirely controls the server 3 with control programs stored in the ROM 53. The real time clock circuit 52 may generate time information from which the CPU 51 can determine a present time period when operating.

The ROM 53 may be a read only memory that stores a variety of control programs used by the CPU 51. The RAM 54 may be a readable and writable memory utilized as a work memory or the like when the CPU 51 performs data processing. The HDD 59 may store both of the user DB 59a and an image forming apparatus supervisory DB 59b. The image forming apparatus supervisory DB 59b may be used to store and supervise control hardware and firmware of respective of the image forming apparatuses in concentrate. The center operator or the like may previously generate these DBs.

As illustrated in FIG. 4, the user DB 59a may store a variety of user information, such as model/machine numbers of image forming apparatuses, IDs for users who purchased the image forming apparatus, and user names for identifying the respective users. Also stored in the user DB 59a for the same purpose may be addresses, names of buildings and persons in charge of users, and telephone numbers of the persons. Furthermore, a plurality of model/machine and connection numbers assigned to a plurality of communications adopters, a plurality of names of service centers in charge for a prescribed service district, a plurality of contact destinations, and a plurality of CEs in charge may be stored in the user DB 59a for the same purpose. The image forming apparatus supervisory DB 59b may include, as illustrated in FIG. 5, a variety of supervisory information such as version numbers of control baseboards, C1, C2, . . . ROMs C11, C12, and units D1, D2 . . . that construct hardware of the respective of the image forming apparatuses. Other information related to the hardware may also be included. Also included in the image forming apparatus supervisory DB 59b may be supervisory information related to firmware (not shown) such as a version number of the firmware for an image forming apparatus or the like.

The display control unit 56 may control interfacing with the CRT display 60 (or a LCD display and so on). The keyboard I/F circuit 57 may control interfacing with the keyboard 61. The network I/F unit 58 may control interfacing with clients 2a, 2b and so on connected to the network 4.

When each of the CPUs in the clients 2a and 2b, the server 3, and so on operates in accordance with control programs excluding firmware which is stored in the ROM, a variety of functions such as firmware download, transmission of a hardware information read instruction, and database update or the like may be performed. Otherwise, to perform the above-described variety of functions, control programs stored in a recordation medium such as a floppy of an optical disc may be read and installed into any one of a hard disc provided in a built in HDD, a non-volatile memory, and a RAM by a disc apparatus such as a built in or external type floppy disc apparatus and an optical disc apparatus.

Figure 6:
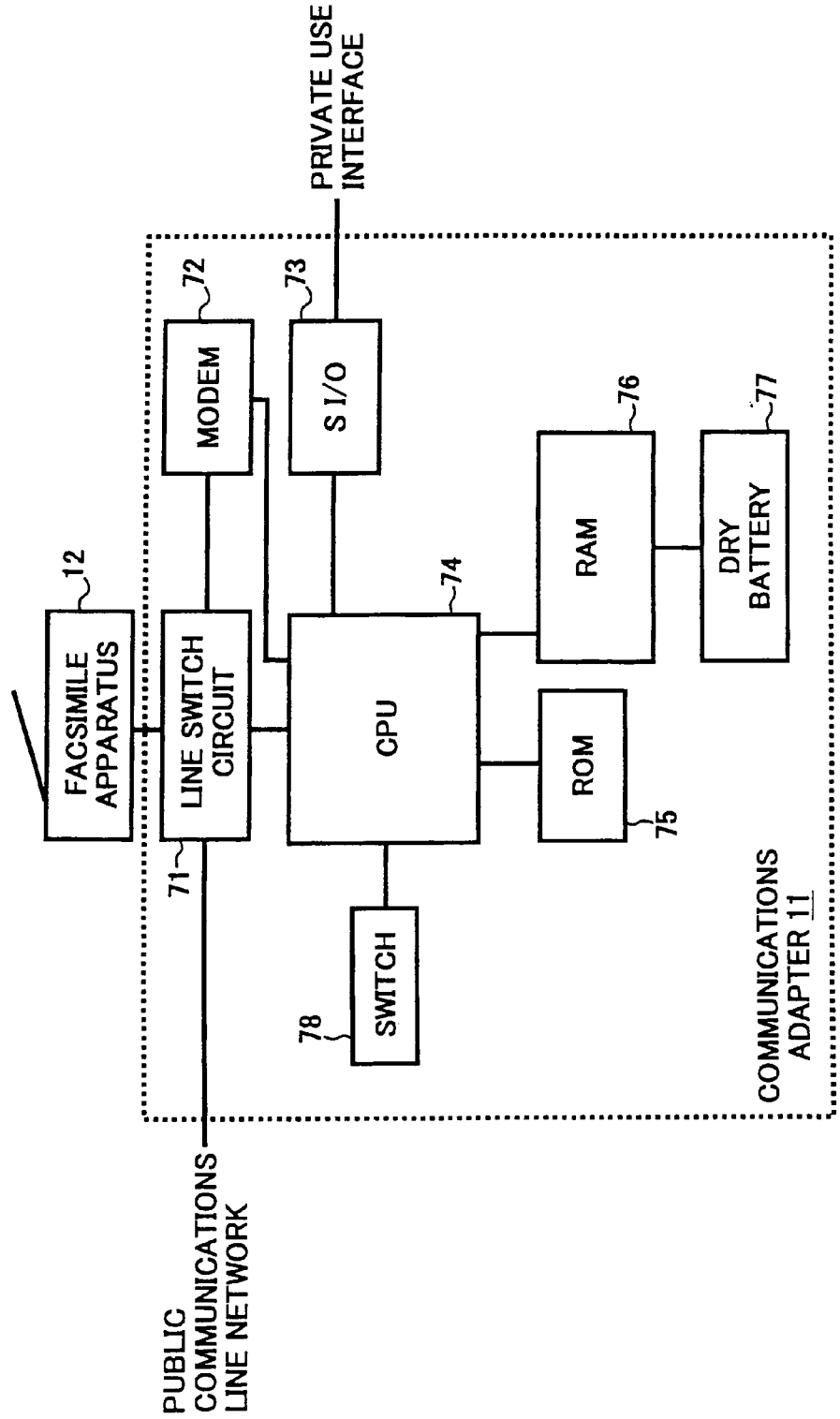
FIG. 6 is a block chart for illustrating an exemplary construction of a communications adapter illustrated in FIG. 1.

FIG. 6 is a block chart for illustrating an exemplary construction of the communications adapter 11 illustrated in FIG. 1. Both of the illustration and description of the communications adapter 21 are omitted because the construction thereof is substantially the same as that of the communications adapter 11. Data from the public communications line network 5 may initially be input to the line switch circuit 71. In the line switch circuit 71, when communications from the public communications line network 5 side is directed to the facsimile apparatus 12 connected to the communications adapter 11, the public communications line network 5 side is connected to the facsimile apparatus 12. In contrast, when communications from the public communications line network 5 side is made from the central system 1, the public communications line network 5 side is connected to the MODEM 72. In addition, communications with a plurality of image forming apparatus sides such as copier sides may be performed using a communications interface (SI/O) that employs a transceiver for RS-485 use.

These controls and operations may be performed mainly by the CPU 74 in accordance with control programs stored in a ROM 75. A RAM 76 may be provided so as to temporary store a variety of data, and which be backed-up by dry battery 77. A switch 78 may be used so as to selectively set a variety of modes. The communications adapter 11 or 21 may continuously periodically perform a polling operation with regard to respective of the image forming apparatuses connected thereto in an order of device addresses assigned thereto.

Figure 7:
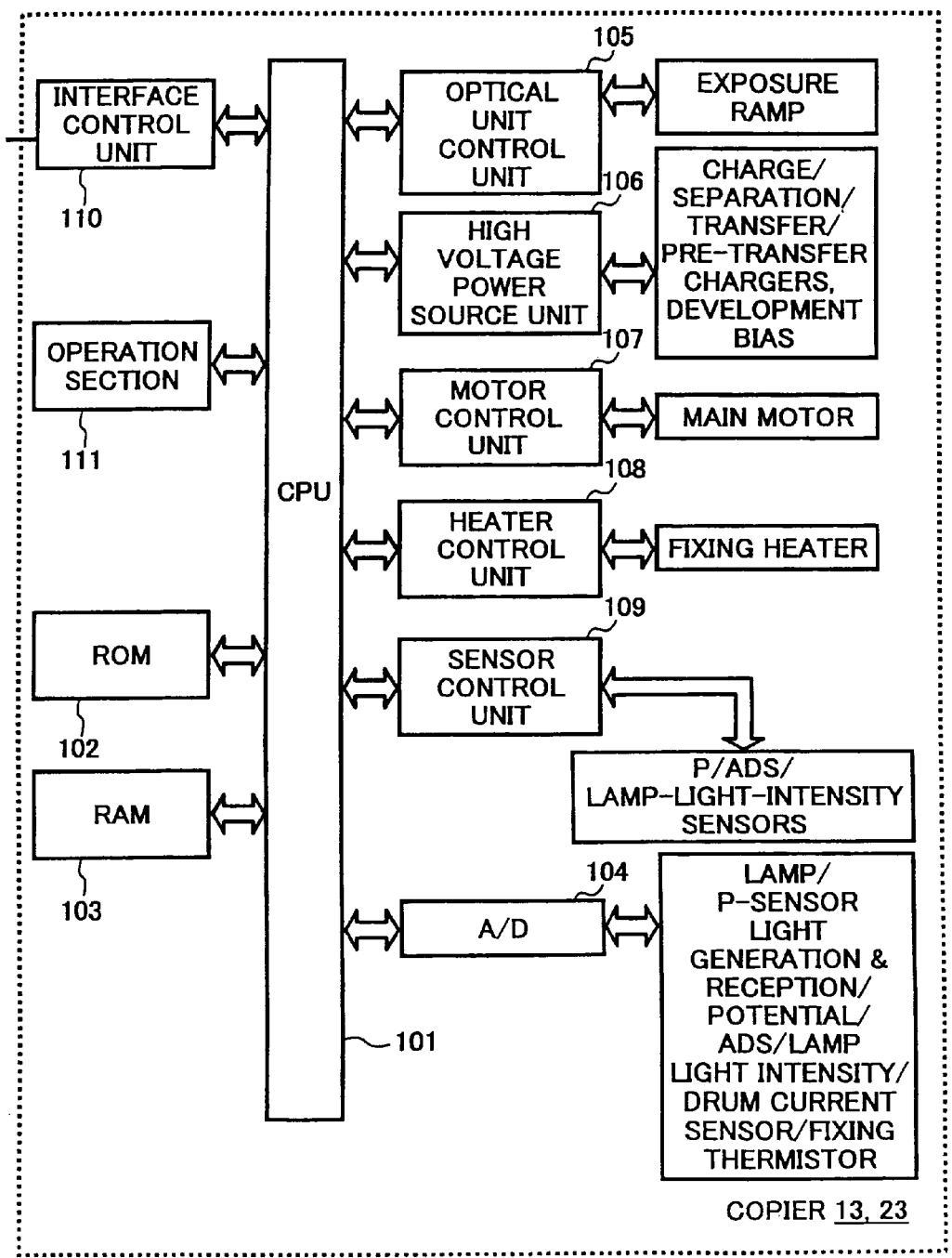
FIG. 7 is a block chart for illustrating the first exemplary construction of a control unit provided in a copier 13 or 23 illustrated in FIG. 1.

FIG. 7 is a block chart for illustrating the first exemplary construction of a control unit provided in the copier 13 or 23. Mainly, a CPU 101 may control the copier 13 or 23 in accordance with control programs, including firmware, and data stored in a ROM 102. The RAM 103 may be utilized so as to store information such as a halfway result of an operation, a variety of set values, status of an apparatus, etc.

The ROM 102 may be a type of rewritable flash ROM. Prescribed firmware may be stored and updated (i.e., rewritten) in the ROM 102 by firmware that is downloaded from the central system 1. Instead of using such a ROM 102, a non-volatile memory such as a RAM backed-up by a dry battery is employable. Otherwise, a non-volatile memory such as a flash ROM for firmware storage private use and/or a RAM backed-up by a dry battery is employable. A ROM 103 may be a non-volatile memory backed-up by a dry battery.

An A/D converter 104 may be used so as to accept a plurality of inputs such as voltage supplied to the exposure lamp and light generation and reception voltages. Also input to the A/D converter 104 may be outputs from a potential sensor, an ADS sensor, a lamp light intensity sensor that detects a light intensity of the exposure lamp, and a drum current sensor that detects a magnitude of current flowing through the PC drum. Furthermore, a thermistor voltage created by the fixing unit maybe input to the A/D converter 104. An optical unit control unit 105 may control an exposure lamp as appropriate. The high voltage power supply unit 106 may apply high voltages to respective of a discharge charger, a separation charger, a transfer charger, and a pre-transfer charger (PTC). The optical unit control unit 105 may also apply a development bias voltage to a developing roller provided in a developing unit. A motor control unit 107 may control a main motor that rotates the PC drum and a plurality of rollers provided in a plurality of paper feed units and a conveying section.

A heater control unit 108 may control a turning ON/OFF operation of power to be supplied to a fixing roller of the fixing unit, and maintain temperature of the surface of the fixing roller within a prescribed range. A sensor control unit 109 may be utilized so as to vary light reception gains of the lamp light intensity sensor, the ADS sensor, and a P-sensor, and light generation voltage of the LED of the P-sensor. An interface control unit 110 may perform communications with the communications adapter 11 or 21. An operation section 111 may include an operation and a display panel that has both of a display section that displays a variety of information and a switch section (e.g. an operational key) to be used to input a variety of information.

The second exemplary construction of the control unit of the copier 13 or 23 illustrated in FIG. 1 and an exemplary construction of the control baseboard (C2) of the operation section 111=provided in the copier 13 or 23 are now described with reference to FIGS. 8 and 9. In contrast to the embodiment illustrated in FIG. 7 wherein a single CPU constitutes the control section of the copier 13 or 23, this example may include a plurality of CPUs (i.e., a multi-processor) as the control section thereof. Specifically, the copier 13 or 23 may mount a control baseboard (C2) that controls an operation/display panel 120 of the operation sections 111=beside the control baseboard (C1) that employs a micro-computer (CPU) including the similar CPU 101, ROM 102, and RAM 103 or the like as those illustrated in FIG. 7.

Figure 9:
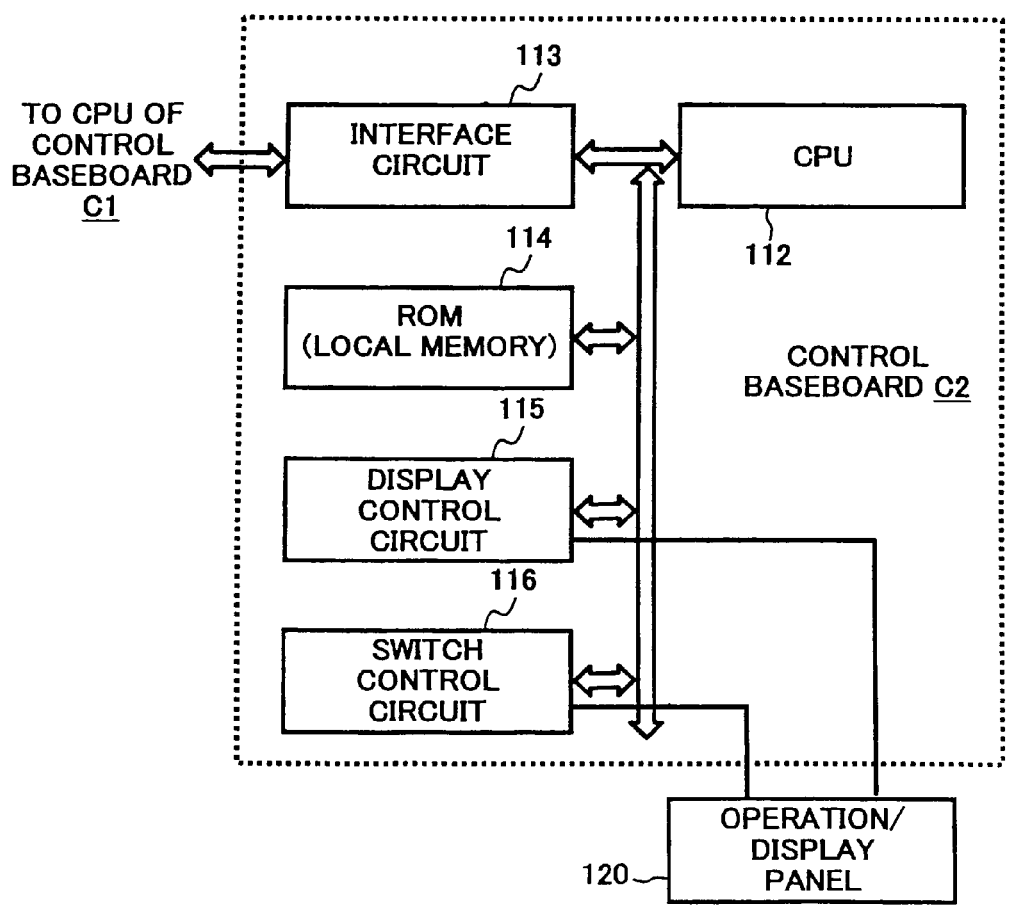
FIG. 9 is a block chart for illustrating an exemplary construction of a control baseboard C2 provided in an operation section 111' illustrated in FIG. 8.

The control baseboard (C2) may include, as illustrated in FIG. 9, a CPU 112, an interface 113, a ROM 114, a display control circuit 115, and a switch control circuit 116. The CPU 112 may be provided as a central processing apparatus to generally entirely control the control baseboard (C2) in accordance with control programs including firmware, stored in the ROM 114. The interface circuit 113 may control interfacing with the CPU 101 of the control baseboard (C1).

The ROM 114 may be a type of a rewritable flash ROM (i.e., a local memory). Prescribed firmware may be stored and updated in the ROM 114 by firmware that is downloaded from the central system 1. Instead of using such a ROM 114, a non-volatile memory such as a RAM backed-up by a dry battery is employable. Otherwise, a non-volatile memory such as a flash ROM for firmware storage private use and/or a RAM backed-up by a dry battery is employable. The display control circuit 115 may control display of the display section of the operation/display panel 120 while operating based upon a control signal transmitted from the CPU 112. A switch control circuit 116 may be provided so as to detect turning ON/OFF of a switch section of the operation/display panel 120 and correspondingly output an operation signal to the CPU 112. In the example of FIGS. 7 and 8, the variety of functions such as firmware download, hardware information transmission, hardware information storage, and hardware information auto update may be performed when the CPU 101 operates in accordance with the control programs excluding the firmware while utilizing the ROM 103 or the like.

Figure 8:
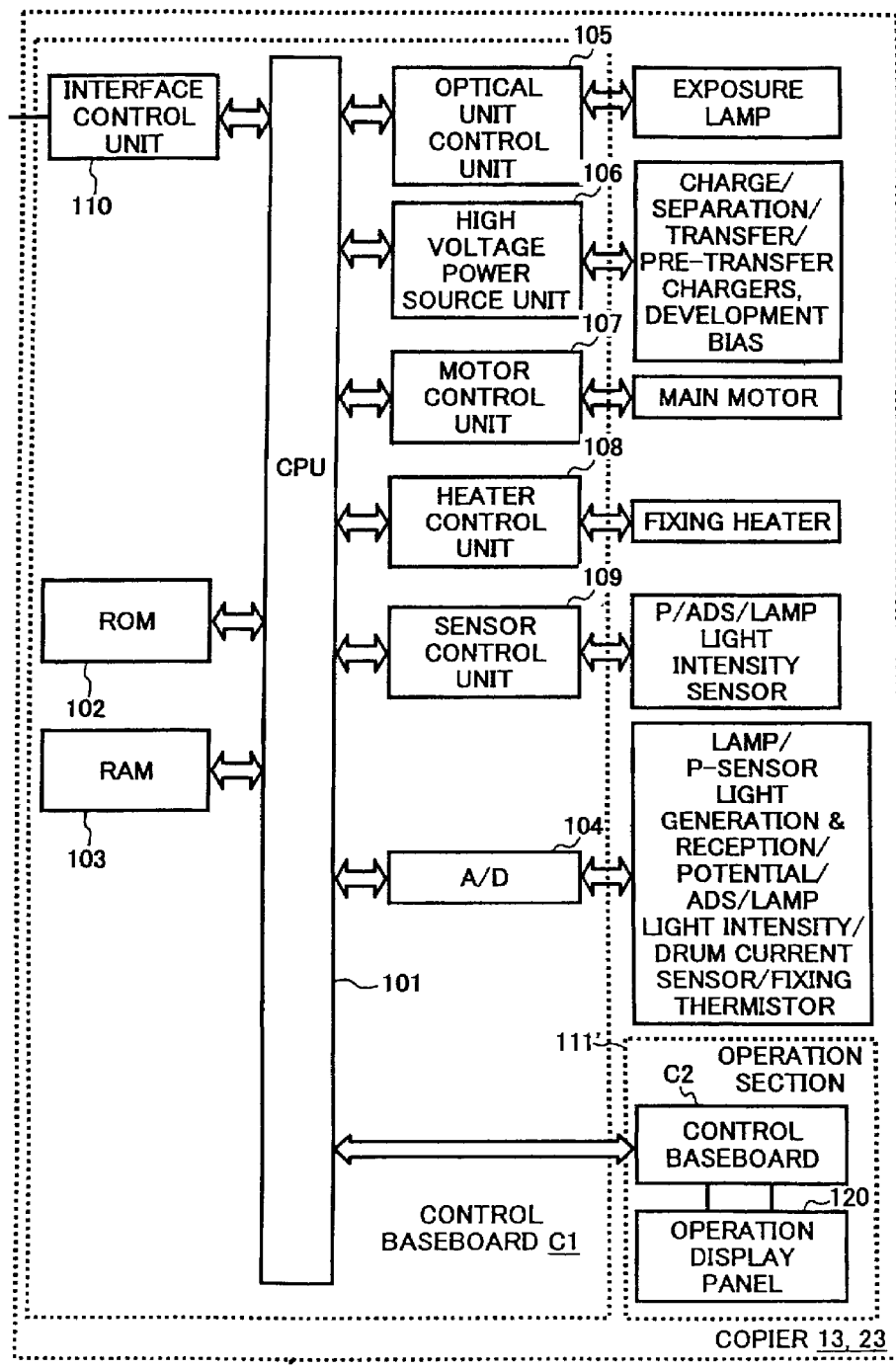
FIG. 8 is a block chart for illustrating a second exemplary construction of the control unit illustrated in FIG. 7.
Figure 10:
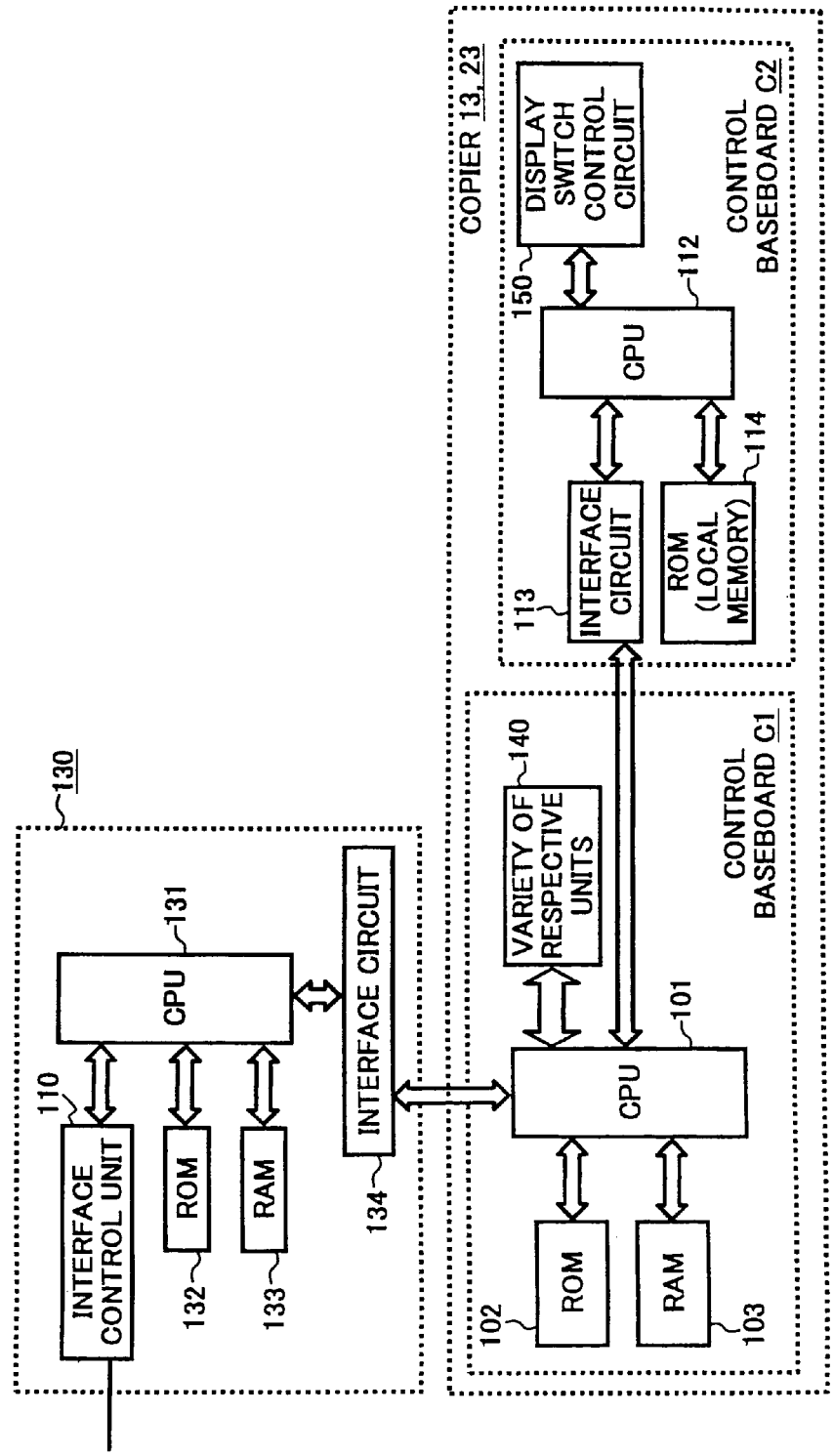
FIG. 10 is a block chart for illustrating a third exemplary construction of the control unit illustrated in FIG. 7.

An exemplary construction of a control unit of the copier 13 or 23 is now described with reference to FIG. 10, wherein description of the same portions as those illustrated in FIG. 7 to FIG. 9 are omitted by assigning the same numbers. A plurality of CPUs may similarly constitute a control section of the copier 13 or 23 as those illustrated in FIGS. 8 and 9. In addition, an image forming apparatus supervisory unit 130 may be detachably connected to the copier 13 or 23. In addition, an interface control unit 110 may be disposed in the image forming apparatus supervisory units 130 (i.e., outside the body of the copier 13 or 23).

The image forming apparatus supervisory units 130 may include, beside the interface control unit 110, a CPU 131, a ROM 132, a RAM, and an interface circuit 134. The CPU 131 may function as a central processing apparatus that generally entirely controls the image forming apparatus supervisory unit 130 using control programs stored in the ROM 132. The ROM 132 may be a read only memory that stores control programs used by the CPU 131. The RAM 133 may be backed-up by a dry battery and provided as a readable and writable memory that is utilized as a work memory when the CPU 131 performs data processing.

The interface circuit 134 may control interfacing with the CPU 101 of the control baseboard (C1). A variety of units 140 may include an A/D converter 104, an optical unit control unit 105, a high voltage power source unit 106, a motor control unit 107, a heater control unit 108, and a sensor control unit 109 as all illustrated in FIGS. 7 and 8. A display/switch control circuit 150 may include a display control circuit 115 and a switch control circuit 116 illustrated in FIG. 9.

In this example, when the CPU 131 operates in accordance with the control programs stored in the ROM 132, a variety of functions such as firmware update, hardware information transmission, hardware information storage, and hardware information auto update may be performed. Since the control unit of the printer 14 or 24 includes substantially the similar construction as that of the copier, illustration and description therefor are omitted.

A plurality of exemplary operations of the image forming apparatus supervisory system of the present invention is now described with reference to FIGS. 10 to 19. FIGS. 11 to 14, 16, and 17 illustrate a plurality of flowcharts for illustrating a variety of operations according to the present invention.

A first example is now described with reference to FIGS. 11 and 12. When one or more firmware utilized in one or more image forming apparatuses among the entire supervisory objectives are required to be updated for any reason (e.g. when a firmware design is changed or used inherent specifications are changed), the center operator of the central system 1 may designate and input one or more image forming apparatuses as firmware update objectives. Specifically, the center operator may designate and input information related to an image forming apparatus such as a model name and a version number of the hardware such as a control baseboard, a unit, a ROM, etc. as keywords (step S1).

Figure 11:
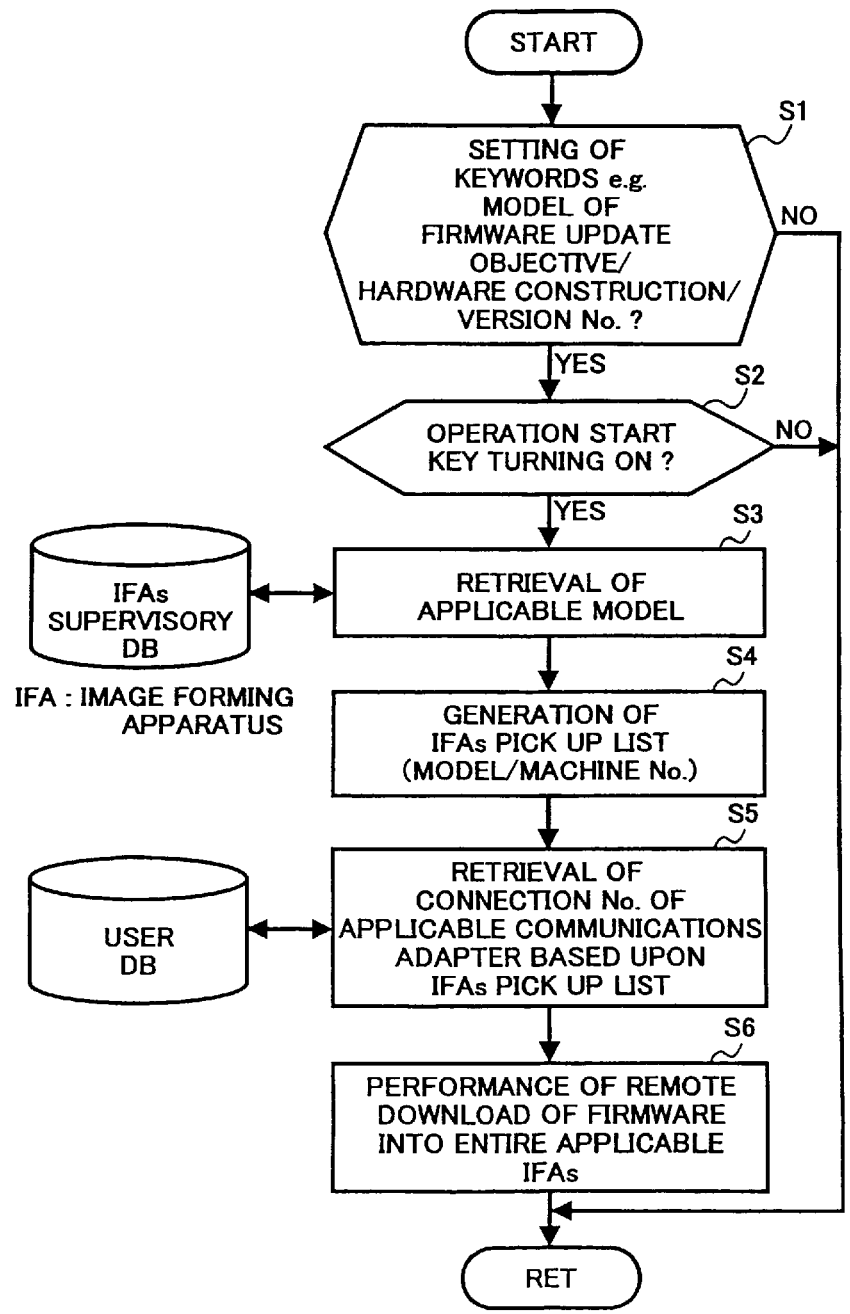
FIG. 11 is a flowchart for illustrating an exemplary firmware download operation performed by the central system 1 illustrated in FIG. 1.
Figure 12:
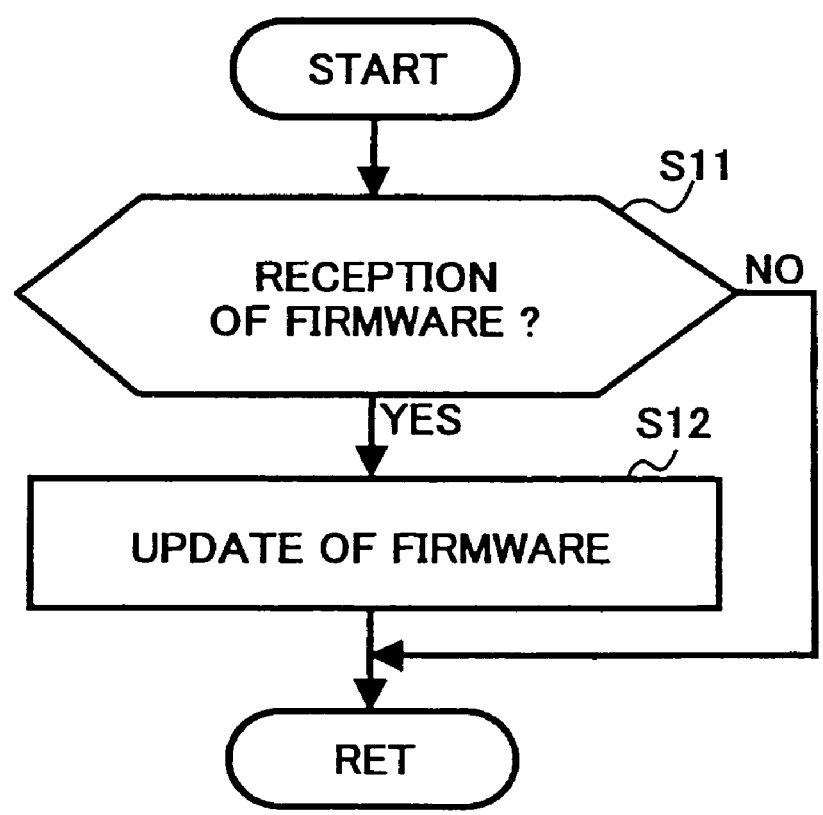
FIG. 12 is a flowchart for illustrating an exemplary firmware update operation performed by each of image forming apparatuses, including the copier 13 or 23 illustrated in FIG. 1.

As illustrated in FIG. 11, when one or more information related to the hardware of the image forming apparatus are designated and input, and a prescribed key is operated (e.g. an operation start key is turned ON) to start downloading of the firmware (step S2), the CPU of the central system 1 may retrieve appropriate information from the image forming apparatus supervisory DB 59b of FIG. 5. Each or all of hardware units can be designated and set as retrieval conditions and prescribed information that conforms to the retrieval conditions can be picked up. Otherwise, such retrieval conditions can be more or less than a prescribed designation version number. For example, one or more prescribed model/machine numbers of the applicable image forming apparatuses of firmware update objectives may then be picked up from the appropriate information from the image forming apparatus supervisory DB 59b (step S3), and an image forming apparatus pick up list may automatically be generated (step S4).

Subsequently, the user DB 59a may automatically be retrieved using the model/machine numbers included in the image forming apparatus pick up list as keywords (step S5). A connection telephone or facsimile number of a prescribed communications adapter that is connected to the applicable one or more image forming apparatuses may then be picked up and all of the numbers may be dialed. Simultaneously, prescribed updated firmware that corresponds to hardware of the applicable image forming apparatus may be downloaded into one or more dial destination image forming apparatuses (step S6). As illustrated in FIG. 12, each of the CPUs of the image forming apparatuses of the user destinations may update firmware previously stored in the ROM (e.g. ROM 102 of FIG. 7) with updated firmware, when the update use firmware is downloaded from the central system (steps S11, S12).

A designation input and retrieval operation performed so as to designate one or more image forming apparatuses of firmware update objectives is now described more in detail.

The ROMs C11, C12, and so on of FIG. 1 maybe flash ROM type memories, each of which includes prescribed firmware. It may be supposed that a version number [0.00] indicates non-mounting.

When information such as version numbers [0.02] for the control baseboard (C1), [1.00] for the optical unit control unit (D1) (e.g. optical unit control unit 105), and [1.20] for the unit D3 (e.g. motor control unit 107) is input as designation information for designating one or more image forming apparatuses of firmware update objectives, the CPU of the central system 1 may pick up one or more model/machine numbers (XX . . . 2) and automatically generate an image forming apparatus pick up list through a retrieval operation for the image forming apparatus supervisory DB 59b. The CPU may then perform substantially the same operation as described earlier. When the updated firmware is downloaded from the central system 1, the CPU of the image forming apparatus having the model/machine number (XX . . . 2) may update firmware previously stored in the ROM of the image forming apparatus with the updated firmware.

When information such as a version number [1.00] of one or more firmware storage use ROM (C21) (e.g. the ROM 114) is input as designation information, the CPU of the central system 1 may pick up a prescribed model/machine number (XX . . . 2) and automatically generate an image forming apparatus pick up list in the same manner as described above.

The CPU of one or more applicable image forming apparatuses of the model/machine number (XX . . . 2) may update firmware stored in the ROM (C21) with updated firmware, when the updated firmware is downloaded from the central system 1. Specifically, when the model/machine number (XX . . . 2) corresponds to the copier 13 illustrated in FIGS. 8 and 9, and the ROM (C21) corresponds to the ROM 114, the CPU in the control baseboard (C1) of the copier 13 may update the firmware, which is stored in the ROM 114, by the CPU 112 via the interface circuit 113 of the control baseboard (C2), with firmware that is downloaded from the central system 1.

Thus, when the CPU of the central system 1 downloads updated firmware and has one or more applicable image forming apparatuses of the user destinations update firmware in accordance with the hardware thereof, preferable updated firmware that conforms thereto can economically and efficiently be downloaded. Specifically, non-conformity of the image forming apparatus supervisory DB 59b of the central system 1 to the hardware of the applicable one or more image forming apparatuses can be minimized. In addition, a problem that could be caused when another download of firmware is later required for the same image forming apparatus can be suppressed. In addition, needless time and labor such as user call and research of the hardware by the CE can be minimized.

Further, since hardware such as a control baseboard and a unit is generally frequently exchanged whenever a user individual specification is changed and/or an application is designed around, a frequency of occurrence of the above-described problem would generally be increased. However, according to the above-described example, a prescribed firmware conforming to a control baseboard and/or a unit can economically efficiently be downloaded thereto in accordance with the hardware.

In addition, since a version of a firmware storage use ROM of one or more image forming apparatuses employing multi-CPUs is monitored, and updated firmware is downloaded in accordance with the firmware storage use ROM, the image forming apparatus can readily update firmware of the firmware storage use ROM with the updated firmware.

Figure 13:
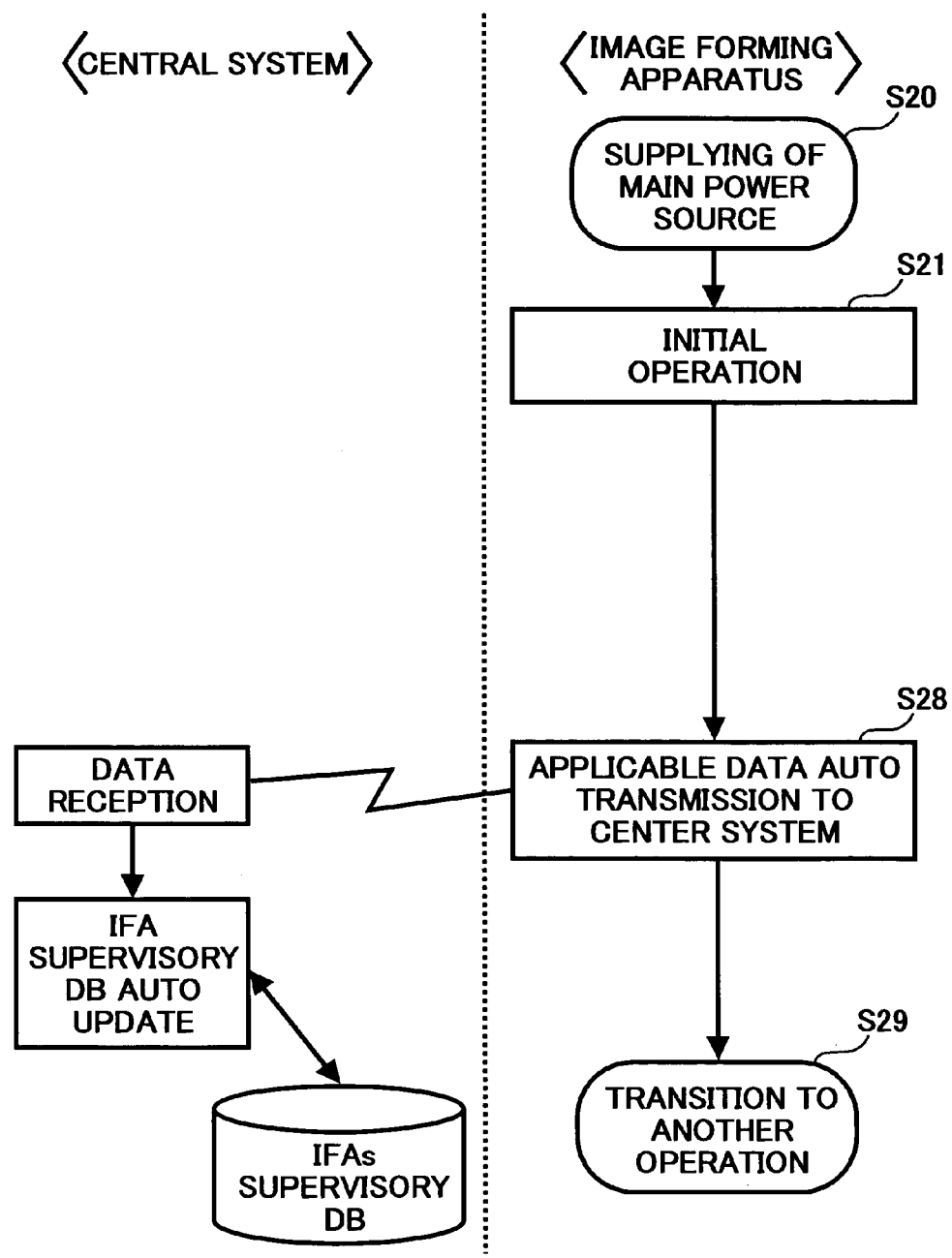
FIG. 13 is a flowchart for illustrating an exemplary hardware information update operation performed by each of image forming apparatuses, including the copier 13 or 23 and the central system 1.

The second example of the operation performed in the image forming apparatus supervisory system is now described with reference to FIG. 13. FIG. 13 is a flowchart for illustrating one example of a hardware information update operation performed both in the image forming apparatuses of the user destinations and the central system 1. The CPU of the image forming apparatus may perform an initial operation (step S21) such as a memory check or the like using control software when a main power is supplied (step S20). The CPU may then read and transmit information related to hardware (e.g. a hardware version number) stored in a later described hardware supervisory table that is stored in the non-volatile memory (e.g. RAM 103) to the central system 1 in a prescribed format as illustrated in FIG. 15 (step S28).

The CPU of the central system 1 may update contents of the image forming apparatus supervisory DB 59*b* with information of the hardware when receiving the hardware information. Specifically, the received information may then be compared with hardware related information that corresponds to a model/machine number added to the received information and stored in the image forming apparatus supervisory DB 59*b*. Then, if both of the hardware related information do not conform to each other, the hardware related information stored in the image forming apparatus supervisory DB 59*b* may be updated with the received hardware related information. The process can then transition to another operation (step S29).

Then, substantially the similar key operation and firmware download operation to those described in the first example may be performed. In addition, the CPUs of the image forming apparatuses may perform substantially the similar firmware update operation as described in the first example.

Thus, a problem caused when the service person exchanges hardware of an image forming apparatus and omits sending a report to the center operator on completion can be minimized. This is because the hardware related information stored in the image forming apparatus supervisory DB 59*b* can automatically be updated, when the power is supplied and the CPU of the image forming apparatus reads and transmits information related to the hardware stored in a hardware supervisory table to the central system 1. As a result, labor and an erroneous update input by the center operator can economically be minimized. Furthermore, when the CPU of the central system 1 performs substantially the similar firmware download operation and the CPU of the image forming apparatus performs substantially the similar firmware update operation as described in the first example, respectively, substantially the same advantages may be obtained.

Although the CPU of the image forming apparatus transmits the hardware related information stored in the hardware supervisory table to the central system 1 when power is supplied in the second example, the information can be transmitted thereto at another timing. For example, the hardware related information stored in the hardware supervisory table can be transmitted to the central system 1 periodically (e.g. at a predetermined time and date) or when communications are made to the central system 1 (e.g. when status information such as a total copy number for maintenance serves use is transmitted to the central system 1 or when information of updated parameters and/or a variety of instructions are received from the central system 1).

Figure 14:
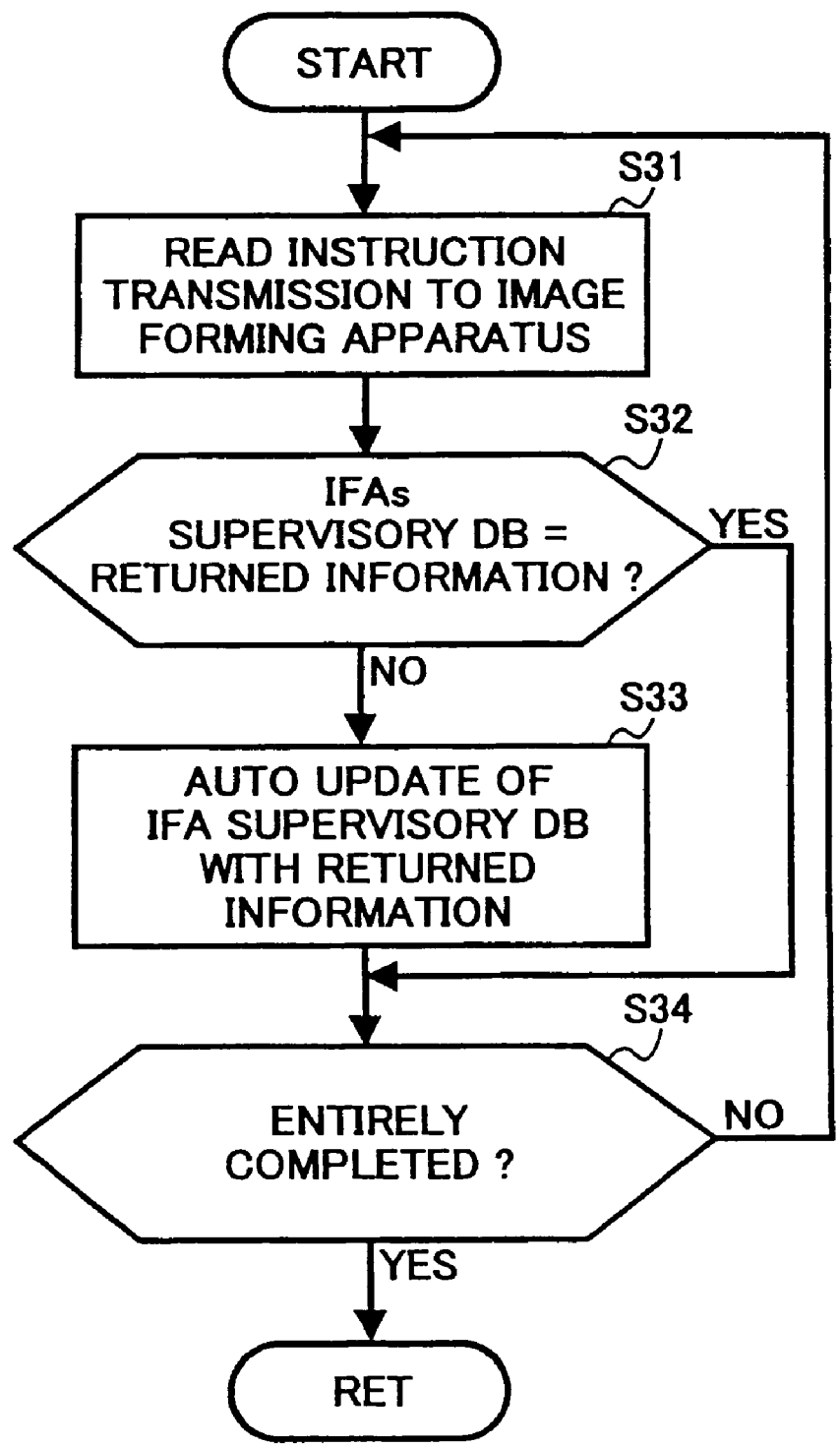
FIG. 14 is a flowchart for illustrating an exemplary hardware information read operation performed by the central system 1 illustrated in FIG. 1.

A third example is now described with reference to FIGS. 14 and 15. FIG. 14 is a flowchart for illustrating an exemplary hardware information read operation that is performed in the central system 1. The CPU of the central system 1 may transmit, when required, a hardware read instruction indicating reading of hardware related information to an applicable one or more image forming apparatuses among all of the image forming apparatuses in a format as illustrated in (1) FIG. 15(A) (step S31). A communications control code or the like is omitted from the information formats (1), (2) as illustrated in FIGS. 15(A) and 15(B).

When receiving the hardware read instruction from the central system 1, each of the CPUs of the applicable one or more image forming apparatuses may read hardware related information (e.g. a hardware version number) stored in a later described hardware supervisory table disposed in the non-volatile memory (e.g. RAM 103) thereof. The CPUs may then transmit the hardware-related information to the central system 1 in the format (2) as illustrated in FIG. 15(B) (step S32).

In the format (2) of FIG. 15(B), substantially the entire information related to the hardware mounted on the image forming apparatus may be indicated therein. Thus, hardware related information excluded from the format may represent that hardware corresponding to the excluded information has not yet been mounted.

When receiving hardware related information by return to transmission of the hardware read instruction, the CPU of the central system 1 may update (if No in step S32) the contents of the image forming apparatus supervisory DB 59*b* with the received information as described in the second example (in step S33). When the operation is entirely completed (in step S34) the process is ended, or else it continues in step S31 (if No in step S34). Then, a prescribed key operation and a firmware download operation may be performed in substantially a similar manner as described in the first example. In addition, each of the image forming apparatuses may perform a firmware update operation in substantially a similar manner as described in the first example.

Thus, the update operation can promptly economically be performed. Specifically, time and labor that generally are required by the CE when the CE researches hardware of an image forming apparatus can be minimized. In addition, the probability of an occurrence of an operational mistake may be suppressed through such operations. Furthermore, when the CPU of the central system 1 performs a firmware download operation and the CPU of the user destination also performs a firmware update operation in substantially a similar manner as described in the first example, substantially the same advantages can be obtained.

In the third example, prescribed firmware may be downloaded to an image forming apparatus of firmware update objective through the prescribed key operation described in the first example. However, such firmware can automatically be downloaded to the image forming apparatus after prescribed hardware related information is received from an image forming apparatus in response to transmission of a firmware construction read instruction. In addition, contents of the image forming apparatus supervisory DB 59*b* can simultaneously be updated with received hardware related information.

Figure 16:
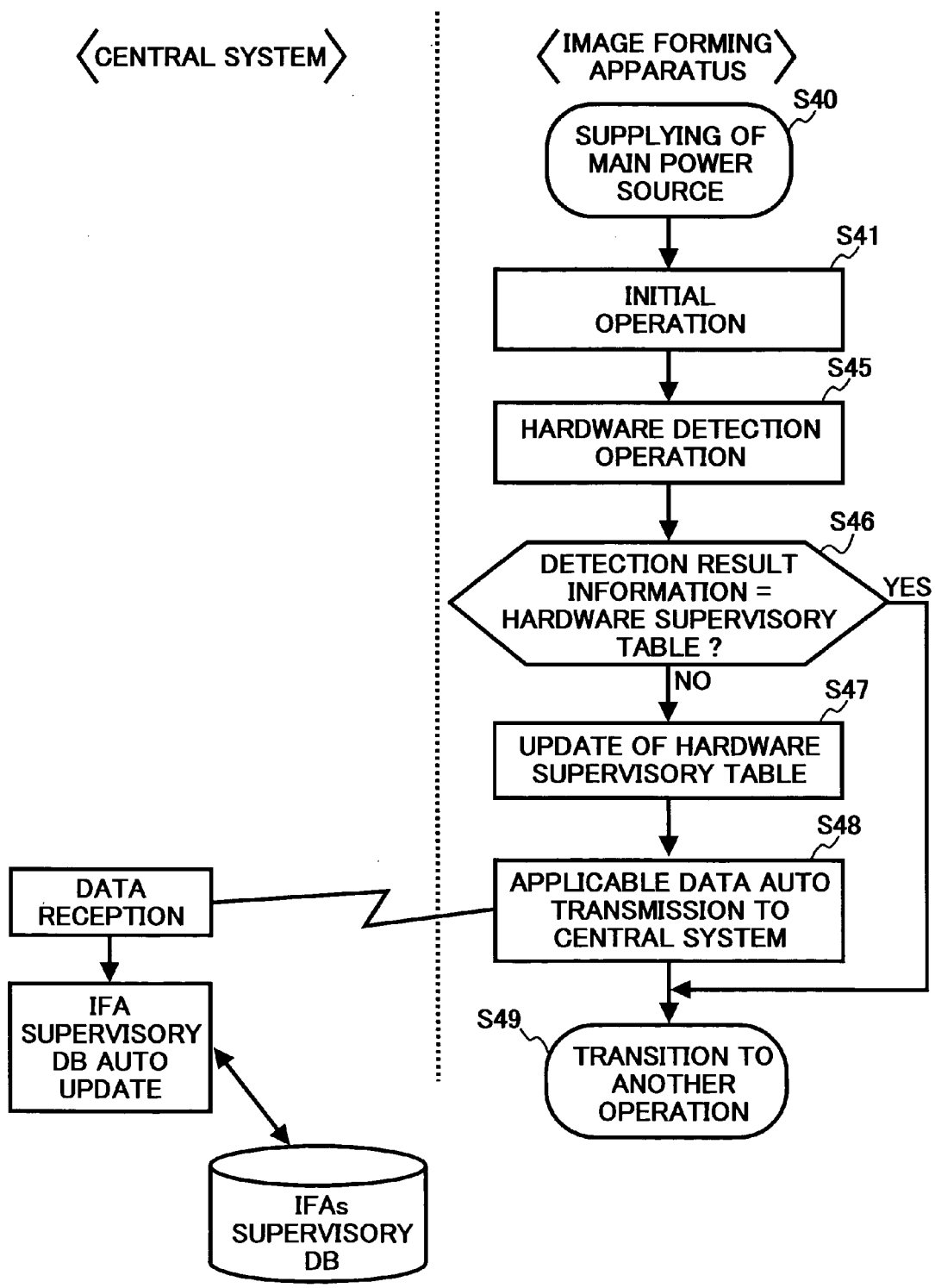
FIG. 16 is a flowchart for illustrating another exemplary hardware information update operation performed by each of the image forming apparatuses, including the copier 13 or 23 and the central system 1 illustrated in FIG. 1.

The fourth example is now described with reference to FIG. 16. FIG. 16 is a flowchart for illustrating another example of a hardware information update operation performed both in the central system 1 and one or more image forming apparatuses of user destinations. Each of CPUs of the image forming apparatuses may perform an initial operation (step S41) such as memory check or the like using control software (e.g. control program) stored in a ROM when a main power is supplied (in step S40). The each of CPUs may then sequentially detect entire hardware (e.g. control baseboards C1 and C2, ROMs C11 and C12, units D1 and D2, and so on) that are mounted on the image forming apparatus (step S45).

For example, the control baseboard C1 may output a version number [1.00] as a response to detection (i.e., reading). If there does not exist such a response, it is determined that a corresponding hardware is not mounted thereon. By detecting and reading entire hardware related information from hardware presently mounted on the image forming apparatus, a detection result indicating information may be generated corresponding to a model/machine number stored in the image forming apparatus supervisory DB 59b of FIG. 5 (step S46). In addition, contents of the hardware supervisory table stored in the non-volatile memory (e.g. RAM 103) of the image forming apparatus may be updated (step S47).

Simultaneously, the detection result indicating information may be compared with hardware-related information previously stored in the hardware supervisory table. It is then determined if both of these information conform with each other. Only if both of these information does not conform to each other, an applicable section (i.e., unconformity section) of the hardware supervisory table may be updated in accordance with the detection result. If the hardware supervisory table is stored in the non-volatile memory after detecting the entire hardware when the image forming apparatus is installed in a user destination and a main power source is firstly supplied thereto, labor such as a previously performed operation using some device can substantially be avoided.

After having updated the contents of the hardware supervisory table (in step S47), to prevent a difference in contents between the hardware supervisory table and the image forming apparatus supervisory table DB 59b, the updated hardware related information is read and transmitted to the central system 1 in the format of FIG. 15(B) (step S48). The CPU of the central system 1 may then update the contents of the image forming apparatus supervisory table DB 59b with the updated hardware related information when it is received. The process can then transition to another operation (step S49).

Specifically, the received hardware related information may be compared with hardware related information that corresponds to the model/machine number added to the received hardware related information. If this information does not conform with each other, hardware related information stored in the image forming apparatus supervisory table DB 59b may be updated with that received. A firmware download operation may be performed through the key operation in substantially a similar manner as described in the first example. Each of the CPUs of the image forming apparatuses of the user destinations may perform a firmware update operation in substantially a similar manner as described in the first example.

Thus, supervisory information can substantially always be kept updated because the CPU of the image forming apparatus automatically updates hardware-related information stored in the hardware supervisory table. In addition, time and labor generally required when a CE researches hardware of an image forming apparatus can be decreased.

In addition, update of hardware related information stored in the hardware supervisory table can efficiently be achieved. In addition, a problem caused when the service person has exchanged the hardware but does not report the service center of hardware exchange can be resolved. In addition, labor of an update input performed by the center operator and an erroneous input or the like can also be minimized.

Furthermore, when the CPU of the central system 1 performs a firmware download operation and the CPU of the image forming apparatus performs a firmware update operation in substantially a similar manner as described in the first example, respectively, substantially the same advantages as described in the first example may be obtained.

Although the CPU of the image forming apparatus of the fourth example updates and transmits the hardware related information stored in the hardware supervisory table to the central system 1 when power is supplied, the hardware related information can be transmitted at another timing. For example, the hardware related information can be updated and transmitted to the central system 1 periodically (e.g. at a predetermined time and date) or when communications are made to the central system 1. For example, it can be performed when status information such as a total copy number for maintenance service use is transmitted to the central system 1 or information of updated parameters and/or a variety of instructions are received from the central system 1.

Figure 15A:
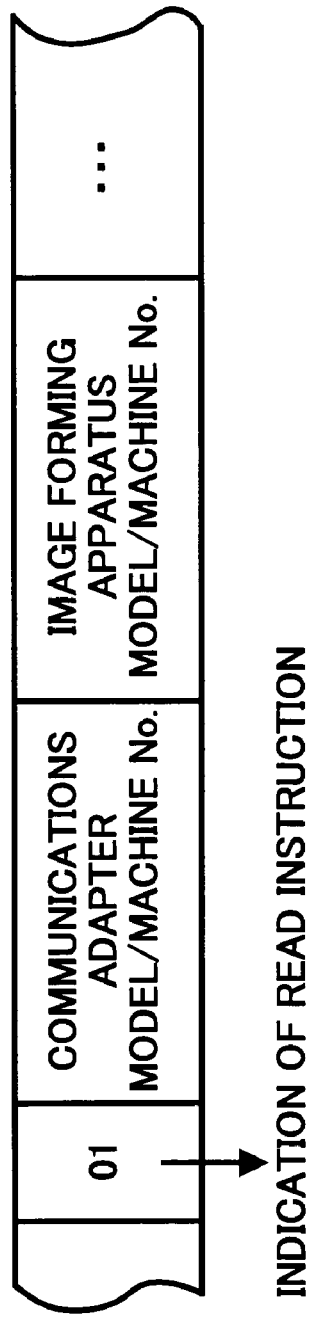

Substantially similar to the third embodiment, the hardware related information stored in the hardware supervisory table can be updated and transmitted to the central system 1, when the CPU of the central system 1 transmits the hardware read instruction to the applicable image forming apparatus when needed in a format (1) as illustrated in FIG. 15(A). Still otherwise, the updated hardware related information can be transmitted to the central system 1 when power is supplied and the CPU of the image forming apparatus updates hardware related information of the hardware supervisory table and receives a hardware read instruction from the central system 1. Otherwise such information can also be transmitted periodically or when communications are made to the central system 1.

The CPU of the image forming apparatus can update applicable sections of the hardware supervisory table when prescribed firmware is downloaded thereto from the central system 1. Further, the CPU 131 of the image forming apparatus supervisory unit of the copier 13 or 23 of FIG. 10 can perform the below-described operation periodically. Otherwise, the below-described operation may be performed when power is supplied, communications are made with the central system 1, a hardware read instruction is received from the central system 1, and/or firmware is downloaded from the central system 1.

Specifically, a plurality of control baseboards C1 and C2, a plurality of ROMs C11 (102), C12, and a plurality of units D1, D2, 140, and so on of the copier 13 or 23 may sequentially be detected using prescribed control software stored in the ROM 132 via the interface circuit 134. In particular, the control baseboard C1 and the ROM C11 (102) may firstly be detected. Then, the CPU 101 disposed in the control baseboard C1 may transmit version numbers, that are assigned to the control baseboard C1 and the ROM C11 (102) and stored in the ROM C11, to the CPU 131 via the interface circuit 134.

The CPU 131 of the image forming apparatus supervisory unit 130 may then update contents of the hardware supervisory table in the RAM 133 with the version numbers of the control baseboard C1 and the ROM C11 (102) obtained by the above-described detection. Specifically, an applicable section of the hardware supervisory table currently storing the version numbers of the control baseboard C1 and the ROM C11 can be updated with those read by the above-described detections. Subsequently, detection for the ROM C12 maybe performed via the interface circuit 134 in a similar manner as described above.

Since the ROM C12 has not yet been mounted, and accordingly its version number can not be read, it is determined that the ROM C12 has not yet been mounted. In addition, the control baseboard C2, the ROMs C11 and C12, and the plurality of units D1, D2, and so on may be detected, and contents of the hardware supervisory table of the RAM 133 may be updated in accordance with detection result in a similar manner as described above.

Figure 17:
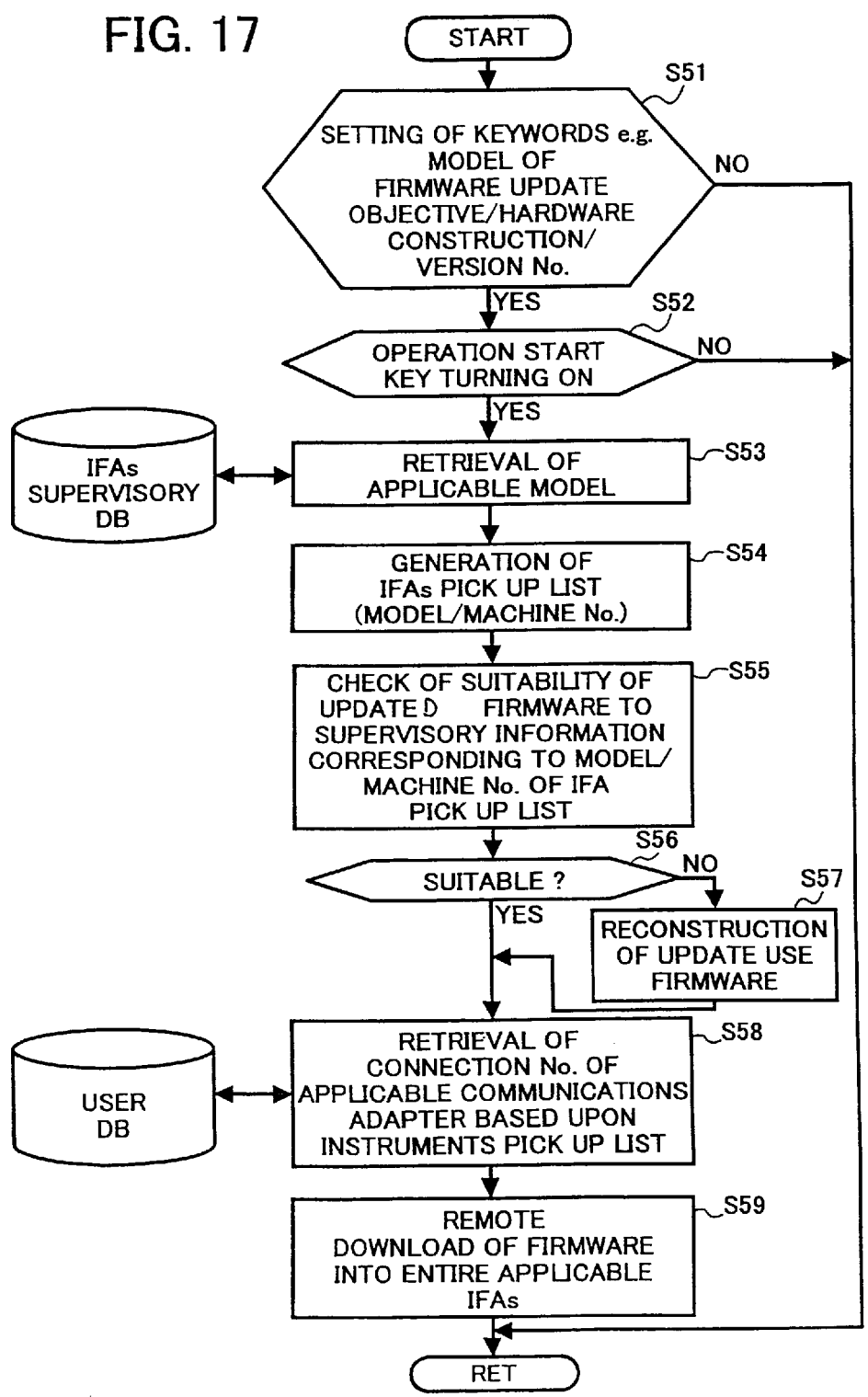
FIG. 17 is a flowchart for illustrating another exemplary firmware download operation performed by the central system 1 illustrated in FIG. 1.

The fifth example is now described with reference to FIGS. 17 to 19. FIG. 17 is a flowchart for illustrating another example of a firmware download operation performed in the central system 1. A firmware update operation may be performed in each of the image forming apparatuses in substantially a similar manner as described in the first example with reference to FIGS. 11 and 12.

The CPU of the central system 1 may retrieve appropriate information from an image forming apparatus supervisory DB 59b of FIG. 5 when prescribed hardware related information of the image forming apparatus of firmware update objective is designated and input, and a key operation for starting download of firmware is performed. Then, one or more model/machine numbers of one or more applicable image forming apparatuses of the firmware update objectives may be picked up from the image forming apparatus supervisory DB 59b, and an image forming apparatus pickup list may automatically be generated. After that, it may be determined if the supervisory information including hardware of one or more image forming apparatuses having these model/machine numbers conform to updated firmware to be downloaded.

Specifically, as illustrated in FIG. 18, if one or more image forming apparatuses whose control baseboard C1, ROMs C11 and C12, optical unit control unit D1, high voltage power supply unit D2, motor control unit D3, and sorter control unit D4 have respective version numbers [1.00], [1.22], [1.00], [1.20], [1.00], [1.10], and [1.00] is the firmware update objective, appropriate information from the image forming apparatus supervisory DB 59b may be retrieved by each of the version numbers as a keyword.

In this example, since one of the model/machine numbers [X X Y 1] that conforms to the version numbers exists in the supervisory information of the image forming apparatus supervisory DB 59b, it is determined from the result of the conformity check that the supervisory information may conform to the updated firmware (step S55). Thus, conformity of the supervisory information of the image forming apparatus supervisory DB 59b to updated firmware may be checked (step S56). If it is determined that the supervisory information does not conform to the updated firmware (No in step S56), the updated firmware may be reconstructed so as to conform to the supervisory data of the image forming apparatus supervisory DB 59b (step S57). If it is determined that the supervisory information conforms to the updated firmware (Yes in step S56), or the updated firmware is reconstructed so as to conform to supervisory data (after step S57), appropriate information from the user DB 59a automatically is retrieved to pick up a connection or facsimile apparatus number assigned to a communications adapter that is connected to applicable one or more image forming apparatuses using the model/machine number of the image forming apparatus pickup list as a keyword (step S58).

Figure 19:
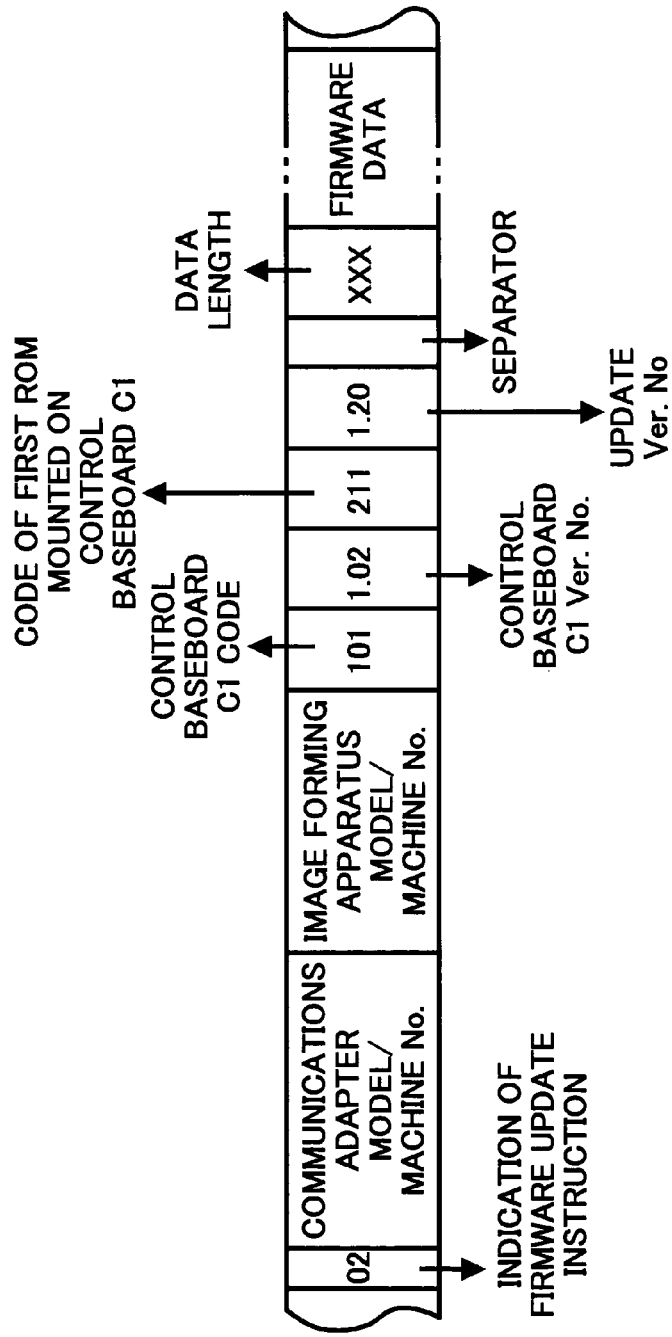
FIG. 19 is a chart for illustrating an exemplary format for firmware update data downloaded from the central system 1 illustrated in FIG. 1 to each of the image forming apparatuses, including the copier 13 or 23.

Then, such picked up numbers may then be dialed and updated firmware may simultaneously be downloaded to the applicable one or more image forming apparatuses as call generation destinations (step S59) in a format as shown in FIG. 19. In particular, the updated firmware may be downloaded together with the updated hardware related information (i.e., a version number or the like) as firmware update data. For example, when a model/machine number of the applicable image forming apparatus includes [XX . . . 1], the firmware update data may be downloaded to the image forming apparatus having the model/machine number [XX . . . 1] so that each of the version numbers of the ROM C11 of the image forming apparatus can be updated with [1.02] and [1.20], and the firmware in the ROM C11 can be updated with the updated firmware that follows the model/machine number [XX . . . 1].

In other words, the CPU of the image forming apparatus may update the firmware in the ROM thereof with the updated firmware included in the firmware update use data, when the firmware update data is downloaded from the central system 1. For example, when an image forming apparatus to which the firmware update data is downloaded includes the model/machine number [XX . . . 1], the CPU of the image forming apparatus may update the firmware stored in the ROM C11 thereof with the updated firmware included in the firmware update data.

In addition, the currently stored hardware related information stored in the hardware supervisory table may also be updated with the updated firmware related information included in the firmware update data. Specifically, the currently stored hardware related information may be compared with the updated firmware that is downloaded, the current hardware related information may be updated with the updated firmware related information when these do not conform to each other.

Thus, a firmware update can economically efficiently be performed.

In addition, occurrence of a problem and poor machine performance that might occur during a firmware download can be suppressed. In addition, analysis of a problem and a repair operation performed by the CE can be omitted or performed if necessary, thereby resulting in minimizing of time and labor for these operations.

As a modification of the fifth example, a hardware information read operation can be initially performed in a similar manner as described in the third example. Subsequently, the image forming apparatus supervisory DB 59b can be updated when hardware related information is received from the image forming apparatus that performs a hardware information update operation in a similar manner as described in the fourth example. Then, it can be determined if supervisory information related to the image forming apparatus conforms to the updated firmware. The updated firmware can be downloaded to the image forming apparatus as appropriate.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

What is claimed:

1. An image forming apparatus supervisory system configured to supervise a plurality of image forming apparatuses disposed at a plurality of user sides, said image forming apparatus supervisory system comprising:
    a central supervisory apparatus configured to include a processor and to determine updated hardware in an applicable one or more of the plurality of image forming apparatuses;
    a plurality of communications adapters configured to connect to the central supervisory apparatus by a communication line; a plurality of interfaces configured to connect each of the plurality of image forming apparatuses with each of the plurality of communications adapters;
    a firmware download device provided in the central supervisory apparatus and configured to download prescribed updated firmware to an applicable one or more image forming apparatuses in accordance with updated hardware of the one or more image forming apparatuses;
    a firmware update device provided in each of the image forming apparatuses and configured to update firmware of the one or more image forming apparatuses with the updated firmware when the updated firmware is downloaded;
    a hardware read device configured to read hardware information of each of the plurality of image forming apparatuses;
    a hardware information transmission device configured to transmit the hardware information from the each respective image forming apparatuses to the central supervisory apparatus;
    a database provided in the central supervisory apparatus and configured to store hardware information of the plurality of image forming apparatuses; and
    a database update device configured to update the database based upon the hardware information when receiving the hardware information from the one or more image forming apparatuses;
    a hardware information storage device provided in the each of the plurality of image forming apparatuses and configured to store its own hardware information;
    a hardware information update device configured to update its own hardware information; and
    a hardware read device provided in the hardware information update device and configured to read at least a version number of the hardware;
    an information comparison device configured to compare the at least a version number with the hardware information stored in the hardware information storage device; and
    a determination device configured to determine if the at least a version number conforms to the hardware information, wherein said hardware information update device updates its own hardware information with the at least a version number only when the at least a version number does conform to the hardware information.

2. The image forming apparatus supervisory system according to claim 1, wherein the updated hardware includes a control baseboard or a unit.

3. The image forming apparatus supervisory system according to claim 1, wherein the updated hardware includes one or more non-volatile memories configured to store prescribed firmware.

4. The image forming apparatus supervisory system according to claim 1, wherein said hardware information is transmitted when power is supplied to the image forming apparatus.

5. The image forming apparatus supervisory system according to claim 1, wherein said hardware information is periodically transmitted at a prescribed interval.

6. The image forming apparatus supervisory system according to claim 1, wherein said hardware information is transmitted when prescribed communications are performed between the one or more applicable image forming apparatuses and the central supervisory apparatus.

7. The image forming apparatus supervisory system according to claim 1, further comprising:
    a hardware read instruction transmission device provided in the central supervisory system and configured to transmit a hardware read instruction to the applicable one or more image forming apparatuses, wherein said hardware information is transmitted when the applicable one or more image forming apparatuses receives the hardware read instruction.

8. The image forming apparatus supervisory system according to claim 1, wherein said hardware information is updated when power is supplied to the image forming apparatus.

9. The image forming apparatus supervisory system according to claim 1, wherein said hardware information is periodically updated at a prescribed interval.

10. The image forming apparatus supervisory system according to claim 1, wherein said hardware information is updated when prescribed communications are performed between the one or more applicable image forming apparatuses and the central supervisory apparatus.

11. The image forming apparatus supervisory system according to claim 8, further comprising:
    a hardware read instruction transmission device provided in the central supervisory system and configured to transmit a hardware read instruction to the applicable one or more image forming apparatuses, wherein said hardware information is read and transmitted to the central supervisory system when the hardware information transmission device of the applicable one or more image forming apparatuses receives the hardware read instruction.

12. The image forming apparatus supervisory system according to claim 1, further comprising:
    a hardware read instruction transmission device provided in the central supervisory system and configured to transmit a hardware read instruction to the applicable one or more image forming apparatuses, wherein said hardware information is updated when the hardware information update device receives the hardware read instruction from the central supervisory apparatus, and is then read and transmitted to the central supervisory apparatus by the hardware information transmission device.

13. The image forming apparatus supervisory system according to claim 11, further comprising:
a conformity check device provided in the firmware download device configured to check conformity of supervisory information including at least the hardware information with the updated firmware, wherein said updated firmware is downloaded if the supervisory information conforms to the updated firmware.

14. The image forming apparatus supervisory system according to claim 13, wherein said updated firmware is regenerated so as to conform to the supervisory information, if the supervisory information does not conform to the updated firmware.

15. A method for remotely supervising a plurality of image forming apparatuses disposed at a plurality of user sides, said method comprising:
providing a central supervisory apparatus configured to include a processor;
providing a communication line configured to connect to the central supervisory apparatus;
providing, at the central supervisory apparatus, a database configured to store and supervise hardware information of the plurality of image forming apparatuses;
transmitting a hardware read instruction from the central supervisory apparatus to an applicable one or more image forming apparatuses;
reading, in the applicable one or more image forming apparatuses, hardware information from hardware of the applicable one or more image forming apparatuses when power is supplied thereto;
comparing the read hardware information with previously stored hardware information stored in a memory;
determining if both of the read and previously stored hardware information conforms with each other;
updating the previously stored hardware information with the read hardware information when both of the read and previously stored hardware information do not conform with each other;
reading the updated hardware information;
transmitting the updated hardware information to the central supervisory apparatus when receiving the hardware read instruction;
updating the database at the central supervisory apparatus when the transmitted updated hardware information is received;
determining if supervisory information stored in the database conforms to prescribed updated firmware corresponding to the updated hardware information; and
downloading the updated firmware to the applicable one or more image forming apparatuses when the supervisory information conforms to the updated firmware.

16. A method for remotely supervising a plurality of image forming apparatuses disposed at a plurality of user sides, said method comprising:
providing a central supervisory apparatus configured to include a processor;
providing a communication line configured to connect to the central supervisory apparatus;
providing, at the central supervisory apparatus, a database configured to store and supervise hardware information of the plurality of image forming apparatuses;
transmitting a hardware read instruction from the central supervisory apparatus to an applicable one or more image forming apparatuses;
periodically reading hardware information, in the applicable one or more image forming apparatuses, from hardware of the applicable one or more image forming apparatuses;
comparing the read hardware information with previously stored hardware information stored in a memory;
determining if both of the read and previously stored hardware information conforms with each other;
updating the previously stored hardware information with the read hardware information when both of the read and previously stored hardware information do not conform with each other;
reading the updated hardware information;
transmitting the updated hardware information to the central supervisory apparatus when receiving the hardware read instruction;
updating the database, at the central supervisory apparatus, when the transmitted updated hardware information is received;
determining if supervisory information stored in the database conforms to prescribed updated firmware corresponding to the updated hardware; and
downloading the updated firmware to the applicable one or more image forming apparatuses when the supervisory information conforms to the updated firmware.

17. A method for remotely supervising a plurality of image forming apparatuses disposed at a plurality of user sides, said method comprising:
providing a central supervisory apparatus configured to include a processor;
providing a communication line configured to connect to the central supervisory apparatus;
providing a database, at the central supervisory apparatus, configured to store and supervise hardware information of the plurality of image forming apparatuses;
transmitting a hardware read instruction from the central supervisory apparatus to an applicable one or more image forming apparatuses;
reading hardware information, in the applicable one or more image forming apparatuses, from hardware of the applicable one or more image forming apparatuses when prescribed communications are performed between the applicable one or more image forming apparatuses and the central supervisory apparatus;
comparing the read hardware information with previously stored hardware information stored in a memory;
determining if both of the read and previously stored hardware information conform with each other;
updating the previously stored hardware information with the read hardware information when both of the read and previously stored hardware information do not conform with each other;
reading the updated hardware information;
transmitting the updated hardware information to the central supervisory apparatus when receiving the hardware read instruction;
updating the database, at the central supervisory apparatus, when the transmitted updated hardware information is received;
determining if supervisory information stored in the database conforms to prescribed updated firmware corresponding to the updated hardware;
downloading the updated firmware to the applicable one or more image forming apparatuses when the supervisory information stored in the database conforms to the updated firmware.

18. An image forming apparatus supervisory system configured to supervise image forming means disposed at a plurality of user sides for forming an image, said image forming apparatus supervisory system comprising:

central supervisory means for remotely supervising image forming means and for determining updated hardware in an applicable one or more of the plurality of image forming apparatuses;

firmware download means for downloading prescribed updated firmware to an applicable one or more image forming means in accordance with updated hardware of the applicable one or more image forming means, said firmware download means provided in the central supervisory means;

firmware update means for updating firmware of the one or more image forming means with the updated use firmware when the updated firmware is downloaded, said firmware update means being provided in each of the image forming means;

hardware read means in each respective image forming apparatus for reading hardware information of each of the plurality of image forming apparatuses;

hardware information transmission means for transmitting the hardware information from the each of the plurality of image forming apparatuses to the central supervisory apparatus;

database means provided in the central supervisory means and for storing hardware information of the plurality of image forming apparatuses; and database update means for updating the database based upon the hardware information when receiving the hardware information from the one or more image forming apparatuses;

a hardware information storage means provided in the each of the plurality of image forming apparatuses and configured to store its own hardware information;

a hardware information update means configured to update its own hardware information; and a hardware read means provided in the hardware information update means and configured to read at least a version number of the hardware;

an information comparison means configured to compare the at least a version number with the hardware information stored in the hardware information storage means; and a determination means configured to determine if the at least a version number conforms to the hardware information, wherein said hardware information update means updates its own hardware information with the at least a version number only when the at least a version number does conform to the hardware information.

* * * * *